(12) United States Patent
Takubo

(10) Patent No.: US 8,297,266 B2
(45) Date of Patent: Oct. 30, 2012

(54) CONTROL APPARATUS FOR AN INTERNAL COMBUSTION ENGINE

(75) Inventor: Hideki Takubo, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 450 days.

(21) Appl. No.: 12/708,113

(22) Filed: Feb. 18, 2010

(65) Prior Publication Data

US 2010/0242935 A1 Sep. 30, 2010

(30) Foreign Application Priority Data

Mar. 30, 2009 (JP) ................................. 2009-081257

(51) Int. Cl.
*F02D 41/00* (2006.01)
*F02D 41/30* (2006.01)
(52) U.S. Cl. ....................................... 123/703; 701/103
(58) Field of Classification Search .................. 123/1 A, 123/27 GE, 299, 434, 491, 495, 543, 575, 123/576, 672, 695, 703, 704, 406.31; 701/103–105, 701/114, 115
See application file for complete search history.

(56) References Cited

U.S. PATENT DOCUMENTS

| | | | |
|---|---|---|---|
| 6,257,174 B1 * | 7/2001 | Huff et al. | 123/1 A |
| 7,159,623 B1 | 1/2007 | Carr et al. | |
| 7,209,826 B2 * | 4/2007 | Abe et al. | 701/109 |
| 7,650,874 B2 * | 1/2010 | Takubo | 123/434 |
| 7,865,295 B2 * | 1/2011 | Tashima | 701/109 |
| 7,908,073 B2 * | 3/2011 | Takubo | 701/103 |
| 7,950,269 B2 * | 5/2011 | Maeda et al. | 73/23.32 |
| 2009/0205622 A1 * | 8/2009 | Kawakita et al. | 123/672 |

FOREIGN PATENT DOCUMENTS

JP 2004-278449 A 10/2004

* cited by examiner

*Primary Examiner* — John T. Kwon
*Assistant Examiner* — Johnny Hoang
(74) *Attorney, Agent, or Firm* — Sughrue Mion, PLLC

(57) ABSTRACT

Provided is a control apparatus for an internal combustion engine which is capable of estimating a single composition concentration based on an air-fuel ratio correction amount obtained by using an output of an air-fuel ratio sensor in exhaust gas and optimizing a fuel injection amount by using a concentration estimation value. When fueling is performed again during alcohol concentration change after the fueling, an alcohol concentration estimation period or a start determination period for the alcohol concentration change is extended by an integrated fuel injection amount from initial fueling until refueling, whereby alcohol concentration estimation accuracy is improved with respect to the alcohol concentration change due to the initial fueling and the refueling.

11 Claims, 20 Drawing Sheets

CONTROL APPARATUS FOR AN INTERNAL COMBUSTION ENGINE

BACKGROUND OF THE INVENTION

1. Field of the Invention

The present invention relates to a control apparatus for an internal combustion engine which enables a motor vehicle to travel even with mixed fuel having an arbitrary ratio of alcohol (single composition) and gasoline, and in particular, to a technique of estimating a single composition concentration based on an air-fuel ratio correction amount obtained by using an output of an air-fuel ratio sensor in exhaust gas and optimizing a fuel injection amount by using a concentration estimation value.

2. Description of the Related Art

There is a motor vehicle called a flexible fuel vehicle (FFV) which is capable of traveling with mixed fuel of various compositions of alcohol and gasoline, in addition to with gasoline alone.

Alcohol has a C (carbon) atom content different from that of ordinary gasoline, and hence, when mixed fuel of alcohol and gasoline is supplied to an internal combustion engine used for the FFV, it is necessary to adjust the amount of fuel to be injected according to the alcohol concentration in fuel.

As such an FFV, there has hitherto been known an FFV in which estimation of the alcohol concentration in fuel is performed by using a correlation between the alcohol concentration and an air-fuel ratio feedback correction coefficient that is calculated based on an air-fuel ratio in exhaust gas detected by an air-fuel ratio sensor (see, for example, JP 2004-278449 A and U.S. Pat. No. 7,159,623).

There occurs a delivery delay before fuel in a fuel tank which has the alcohol concentration changed due to refueling arrives at an injector that supplies the fuel to an internal combustion engine, and the delay becomes larger in a returnless fuel supply system.

In a general returnless fuel supply system illustrated in FIG. 20, fuel in a fuel tank is delivered to a fuel supply pipe via a fuel pump and a pressure regulator, led into a delivery pipe, and injected from an injector into an internal combustion engine at appropriate injection timing.

On the downstream side of the pressure regulator, the fuel moves only by a distance equivalent to the amount of the fuel injected from the injector and a delay in alcohol concentration change is large. However, on the upstream side of the pressure regulator, because the fuel always circulates through a channel of from the fuel tank to the fuel pump to the pressure regulator to the fuel tank, the delay in alcohol concentration change is extremely small.

Therefore, the delay in alcohol concentration change from the fuel in the fuel tank to the fuel in the injector can be represented by a fuel transfer delay between the fuel supply pipe on the downstream side of the pressure regulator and the fuel supply delivery pipe for injector. A delay in a relatively slim fuel supply pipe is a dead time delay. A delay in a relatively thick fuel supply delivery pipe is a first order delay because the fuel is mixed in the pipe. Such a dead time delay and a first order delay change inversely with a fuel flow rate. When organized by using an integrated injection amount, the delays can be represented by a predetermined function.

FIG. 21 illustrates waveform charts illustrating a delay in alcohol concentration change represented by the predetermined function. The abscissa indicates the integrated injection amount and the ordinate indicates alcohol concentrations in the fuel tank and the injector. When fuel with a high alcohol concentration is supplied to the fuel tank by fueling in a state in which the integrated injection amount is "0", the alcohol concentration in the fuel tank rises. On the other hand, the alcohol concentration in the injector changes with delays of dead time Q1 and a first order delay Q2. In a period of this concentration change (=Q1+Q2), the integrated injection amount is a predetermined integrated injection amount.

The period of the concentration change in the dead time and the first order delay after the fueling corresponds to several tens minutes at a low fuel flow rate during idling operation of the internal combustion engine and corresponds to several minutes at a high fuel flow rate during high-load operation. Therefore, the period is innegligibly long.

In the conventional apparatuses disclosed in JP 2004-278449 A and U.S. Pat. No. 7,159,623, a period in which the concentration changes with the first order delay after the dead time ends is set based on an integrated injection amount after fueling, and the alcohol concentration is estimated in this set period. While the alcohol concentration estimation is carried out, it is necessary to, for example, inhibit vaporized gas introduction and forcibly carry out air-fuel ratio feedback control, and hence functions of controls other than the concentration estimation degrade. Therefore, the degradation in the functions of the other controls is minimized by discretely carrying out concentration estimation according to the behavior of the concentration change in the first order delay.

In the conventional apparatuses proposed by the inventors, as illustrated in FIG. 21, the integrated injection amount in the period of the dead time fluctuates because of various factors, and hence, when the fluctuation in air-fuel ratio feedback correction coefficient increases after the fueling, it is determined that the dead time has ended and the change in the first order delay has started. A period of the concentration change with the first order delay is set based on the integrated injection amount after the determination of the start. The alcohol concentration is estimated in this set period. As a factor of the fluctuation in the dead time, for example, during the stop of the internal combustion engine, such as during the fueling, the fuel in the fuel supply pipe and the delivery pipe is pushed back to the fuel tank by vaporized fuel caused by transferred heat from the internal combustion engine. The discrete concentration estimation can be carried out according to the behavior of the concentration change in the first order delay irrespectively of the fluctuation in end time of the dead time. Therefore, suppression of the degradation in the functions of the other controls and improvement of concentration estimation accuracy are realized.

A period in which the determination of the start is performed according to the fluctuation in air-fuel ratio feedback correction coefficient is set based on the integrated injection amount after the fueling like a period Q3 illustrated in FIG. 21 to cover a fluctuation width of end time of the dead time. When fluctuation does not occur during the period, the alcohol concentration estimation is not carried out on the assumption that an alcohol concentration change is not caused by the fueling. When it is determined that a concentration change is not caused by the fueling, the degradation in the functions of the other controls due to the concentration estimation is prevented by stopping the concentration estimation.

When the abscissa is organized by the integrated fuel injection amount, as illustrated in FIGS. 22A to 22C, it is understood that an alcohol concentration change in the injector, which occurs when fueling is performed again in a period until the alcohol concentration change after the fueling ends, is superimposition (FIG. 22C) of an alcohol concentration change in the injector in the dead time and the first order delay with respect to an alcohol concentration change in the fuel tank due to the initial fueling (FIG. 22A) and an alcohol concentration change in the injector in the dead time and the first order delay with respect to an alcohol concentration change in the fuel tank due to the refueling (FIG. 22B). The end time of the alcohol concentration change is extended from the end time by the initial fueling. An extended period is a period of an integrated injection amount from the initial fueling to the refueling. As illustrated in FIGS. 23A and 23B, various combinations are conceivable for the concentration changes before and after the refueling and the time of the refueling.

In the conventional apparatuses disclosed in JP 2004-278449 A and U.S. Pat. No. 7,159,623, when fueling is performed again in a period until the alcohol concentration change after the fueling ends, processing of estimating the alcohol concentration in operation is stopped and started from the beginning. Therefore, processing for alcohol concentration estimation corresponding to the alcohol concentration change due to the refueling can be carried out. However, processing for alcohol concentration estimation corresponding to the alcohol concentration change due to the initial fueling is suspended, and the alcohol concentration change due to the initial fueling cannot be sufficiently dealt with. In another case, because the concentration estimation period is set to a period corresponding to the initial fueling while refueling in the period until the alcohol concentration change after the fueling ends is neglected, the initial fueling can be dealt with, but an alcohol concentration change due to the refueling cannot be dealt with.

Further, in the apparatuses proposed by the inventors, the alcohol concentration estimation period is set after the fluctuation in air-fuel ratio feedback correction coefficient after the fueling increases. When the refueling is performed by the time the alcohol concentration change after the fueling ends, the fluctuation in the air-fuel ratio feedback correction coefficient due to the concentration change due to the refueling overlaps the fluctuation due to the concentration change of the initial fueling and cannot be separated. Therefore, an alcohol concentration estimation period corresponding to the refueling cannot be set.

Further, when the period in which the determination of the start is performed according to the fluctuation in the air-fuel ratio feedback correction coefficient is set to the predetermined period after the initial fueling, it is likely that the initial fueling can be dealt with, but the refueling cannot be dealt with. For example, when an alcohol concentration change is not caused by the initial fueling but an alcohol concentration change is caused by the refueling, an implementation period for the determination of the start ends before the fluctuation in air-fuel ratio feedback correction coefficient due to the refueling starts. Therefore, alcohol concentration estimation cannot be carried out. In another case, when the implementation period for the determination of the start is reset to the predetermined period after the refueling when the refueling is performed during the determination of the start after the initial fueling, the refueling can be dealt with, but the initial fueling cannot be dealt with.

SUMMARY OF THE INVENTION

The present invention has been devised in view of the points described above, and it is an object of the present invention to obtain a control apparatus for an internal combustion engine which is capable of estimating a single composition concentration based on an air-fuel ratio correction amount obtained by using an output of an air-fuel ratio sensor in exhaust gas and optimizing a fuel injection amount by using a concentration estimation value.

According to the present invention, there is provided a control apparatus for an internal combustion engine, including: a fuel supply device for supplying fuel in a fuel tank to the internal combustion engine; air-fuel ratio detecting means that is set in an exhaust system of the internal combustion engine, for detecting an air-fuel ratio in exhaust gas from the internal combustion engine; air-fuel ratio correction amount calculating means for calculating, based on a detection value of the air-fuel ratio detecting means, an air-fuel ratio correction amount for correcting a fuel injection amount to the internal combustion engine; concentration estimating means for calculating a concentration estimation value of a single composition of the fuel based on the air-fuel ratio correction amount calculated by the air-fuel ratio correction amount calculating means; and fuel injection amount calculating means for correcting the fuel injection amount based on the air-fuel ratio correction amount and the concentration estimation value. The concentration estimating means includes: fueling determining means for detecting that the fuel has been supplied to the fuel tank; concentration change period setting means for starting a concentration change period when it is determined by the fueling determining means that fueling has been performed and the fueling is in a period other than the concentration change period, and ending the concentration change period when an integrated fuel injection amount after start of the concentration change period reaches a first determination value; concentration change period extending means for increasing, when it is determined by the fueling determining means that the fueling has been performed and the fueling is in the concentration change period, the first determination value by an integrated fuel injection amount from a start time point of the concentration change period until a time point when it is determined that the fueling has been performed; and concentration update permitting means for permitting concentration update in the concentration change period. The concentration estimating means extends a concentration estimation period when it is determined that refueling has been performed during concentration change.

Further, there is provided a control apparatus for an internal combustion engine, including: a fuel supply device for supplying fuel in a fuel tank to the internal combustion engine; air-fuel ratio detecting means that is set in an exhaust system of the internal combustion engine, for detecting an air-fuel ratio in exhaust gas from the internal combustion engine; air-fuel ratio correction amount calculating means for calculating, based on a detection value of the air-fuel ratio detecting means, an air-fuel ratio correction amount for correcting a fuel injection amount to the internal combustion engine; concentration estimating means for calculating a concentration estimation value of a single composition of the fuel based on the air-fuel ratio correction amount calculated by the air-fuel ratio correction amount calculating means; and fuel injection amount calculating means for correcting the fuel injection amount based on the air-fuel ratio correction amount and the concentration estimation value. The concentration estimating means includes: fueling determining means for detecting that the fuel has been supplied to the fuel tank; start determining means for determining that a start condition is satisfied when the fueling is in the concentration change period and fluctuation in the air-fuel ratio correction amount increases; concentration change period setting means for starting a concentration change period when it is determined by the fueling determining means that fueling has been performed and the fueling is in a period other than the concentration change period, and ending the concentration change period when an integrated fuel injection amount after start of start determination reaches a second determination value; concentration change period extending means for increasing, when it is determined by the fueling determining means that the fueling has been performed and the fueling is in the concentration change period, the second determination value by an integrated fuel injection amount from a start time point of the concentration change period until a time point when it is determined that the fueling has been performed; and the concentration update permitting means for permitting concentration update in a period from a time point of the start of the start determination until an end time point of the concentration change period. The concentration estimating means extends a concentration estimation period after the start determination when it is determined that refueling has been performed during concentration change.

According to the present invention, when fueling is performed again during concentration change of a single composition after fueling, the concentration estimation period for the single composition or a start determination period for the concentration change of the single composition is extended by the integrated fuel injection amount from initial fueling until refueling. This results in improving estimation accuracy of the single composition with respect to the concentration change of the single composition due to the initial fueling and the refueling.

DETAILED DESCRIPTION OF THE PREFERRED EMBODIMENTS

First Embodiment

In a first embodiment of the present invention, a concentration change period is set after fueling determination and alcohol concentration in fuel is estimated as single composition concentration in fuel based on an air-fuel ratio feedback correction coefficient.

Figure 1:
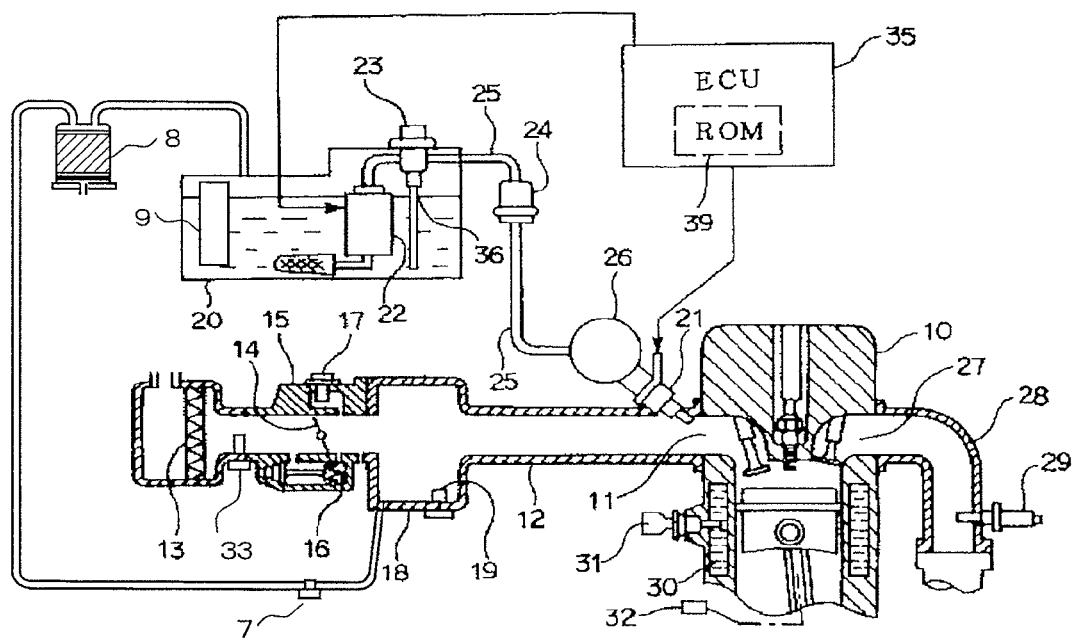
FIG. 1 is a block diagram schematically illustrating a configuration of a control apparatus for an internal combustion engine according to first and second embodiments of the present invention.

FIG. 1 illustrates a schematic configuration of a control apparatus for an internal combustion engine according to the first embodiment of the present invention. It should be noted that the internal combustion engine illustrated in FIG. 1 is a kind of internal combustion engine that uses a fuel containing alcohol. An air cleaner 13 is arranged at a most upstream portion of an intake pipe 12 which is connected to individual intake ports 11 of an engine 10 that constitutes the internal combustion engine. An air flow meter 33 for detecting an intake air amount qa of air to the engine 10 is mounted at a location downstream of the air cleaner 13. Further, a throttle valve 14 is arranged at a location downstream of the air flow meter 33. In a throttle body 15 that receives the throttle valve 14, there are arranged an idle speed control valve 16 for adjusting the amount of intake air bypassing the throttle valve 14 and an intake pipe pressure sensor 17 for detecting the pressure in the intake pipe 12. A surge tank 18 is arranged at a location downstream of the throttle body 15. An intake air temperature sensor 19 for detecting the temperature of intake air is arranged in the surge tank 18.

In addition, in the vicinity of the intake ports 11 of the individual cylinders, there are arranged fuel injecting valves (injectors) 21 that serve to inject the fuel supplied from a fuel tank 20 into the corresponding cylinders. The fuel in the fuel tank 20 is drawn up by a fuel pump 22, and is sent to a delivery pipe 26 that serves to supply the fuel to the injectors while passing through a fuel supply pipe 25 via a pressure regulator 23 and a fuel filter 24. Hence, the fuel it is distributed from the delivery pipe 26 to the fuel injecting valves 21 of the respective cylinders. The above-mentioned pressure regulator 23 has a back pressure chamber defined therein which is opened to the atmosphere. A surplus of the fuel sent from the fuel pump 22 to the pressure regulator 23 is returned from a fuel return opening 36 of the pressure regulator 23 into the fuel tank 20.

The fuel supply system as described above becomes a returnless fuel supply system in which a return pipe for returning the surplus fuel from the delivery pipe 26 into the fuel tank 20 is abolished, and the fuel supply pipe 25 terminates at the delivery pipe 26. A fuel level gauge 9 for detecting the liquid level of fuel is installed in the fuel tank 20. A water temperature sensor 31 for detecting the temperature of cooling water is mounted on a water jacket 30 that serves to cool the engine 10. Further, the r.p.m. of the engine 10 is detected by the frequency of a pulse signal which is output from a crank angle sensor 32 at every predetermined crank angle.

Detection signals of various sensors provided in the engine 10 and around the engine 10 are input to an engine control unit (hereinafter referred to as "ECU") 35 including a microcomputer. The ECU 35 includes a backup RAM or EEPROM (not shown) for storing data used for various kinds of arithmetic processing described later, and a ROM 39 having an arithmetic control program stored therein. The fuel injecting valve (injector) 21 injects and supplies, according to an injection command signal from the ECU 35, fuel into intake air in the intake pipe 12 so as to obtain a predetermined air-fuel ratio according to an operation condition.

On the other hand, an oxygen concentration sensor (air-fuel ratio detection means) 29 for detecting the air-fuel ratio of an exhaust gas is mounted on an exhaust pipe 28 that is connected to individual exhaust ports 27 of the engine 10. A three-way catalyst (not shown) for purifying the exhaust gas is arranged at a location downstream of the oxygen concentration sensor 29. When the air-fuel ratio lies within a so-called window that is defined around a theoretical air-fuel ratio, the three-way catalyst is able to purify NOx, HC and CO in the exhaust gas at the same time with maximum conversion efficiency. As a result, the ECU 35 performs air-fuel ratio feedback control for the exhaust gas based on the detected air-fuel ratio from the oxygen concentration sensor 29 arranged on the upstream side of the three-way catalyst, in such a way that the air-fuel ratio of the exhaust gas varies within the range of the above-mentioned window.

A canister 8 is connected to the fuel tank 20 so that the vaporized gas generated from the fuel in the fuel tank 20 is adsorbed in the canister 8. Also, the canister 8 is connected via a valve 7 to the surge tank 18 of the intake pipe 12. At the time of introduction of the vaporized gas, the valve 7 is opened under the control of the ECU 35, and the vaporized gas that has been adsorbed in the canister 8 is introduced through the intake pipe 12 into the engine 10.

Incidentally, as is well known, the fuel containing alcohol has the contents of C (carbon) atoms and O (oxygen) atoms differing from those of ordinary gasoline, and hence in order to obtain the same equivalence ratio, a larger amount of fuel injection is required. Thus, when the mixed fuel of alcohol and gasoline is supplied to the engine, it is necessary to adjust the amount of fuel injection in accordance with the alcohol concentration in the fuel. Accordingly, by using the value of the air-fuel ratio detected by the oxygen concentration sensor 29, the ECU 35 estimates the alcohol concentration in the fuel, corrects the injection command signal, and reflects the alcohol concentration on the amount of fuel to be injected. In other words, the ECU 35 estimates single composition concentration (alcohol concentration) in the fuel using a correction coefficient for air-fuel ratio feedback control based on the detected air-fuel ratio.

Figure 2:
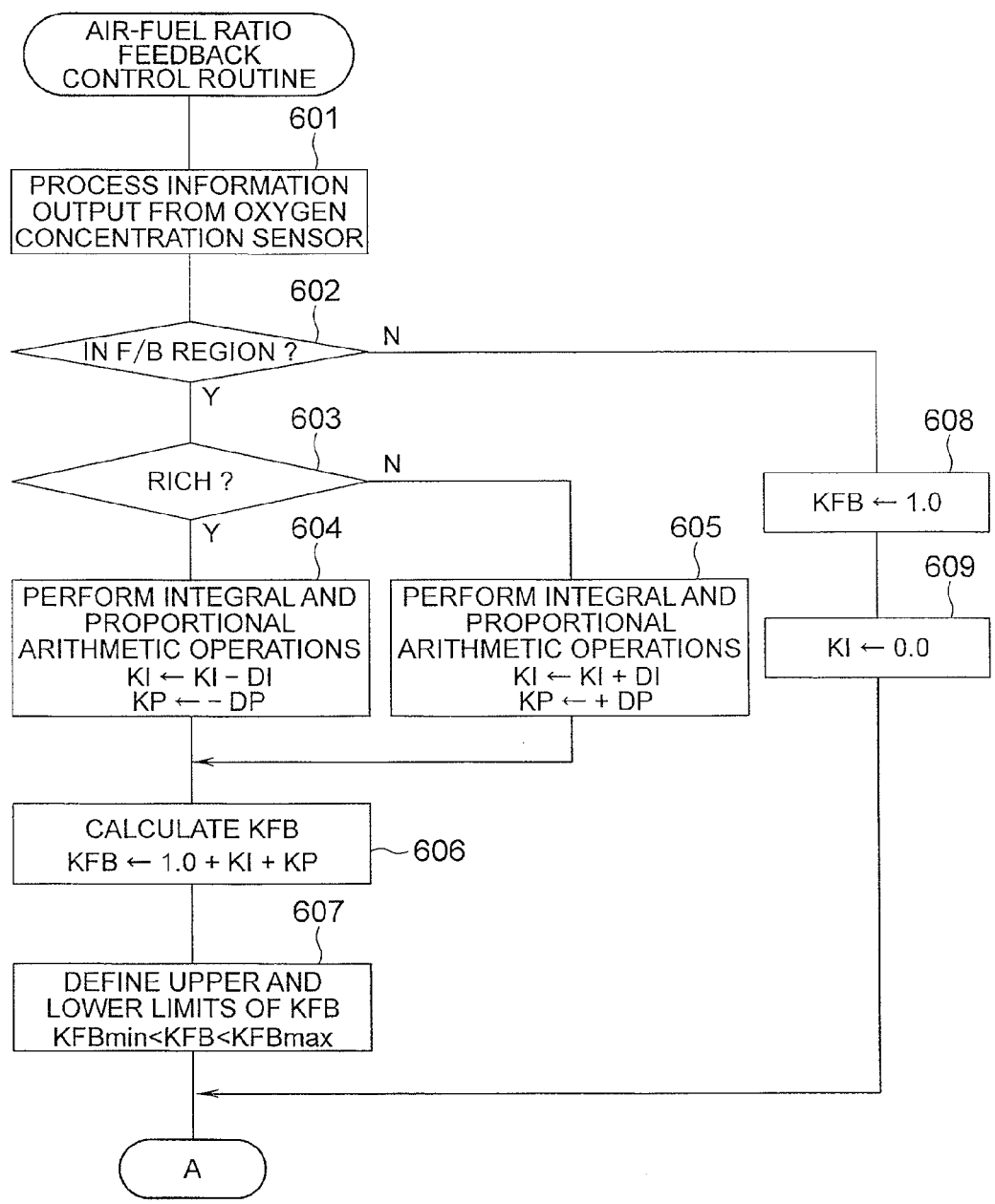
FIG. 2 is a flowchart illustrating an air-fuel ratio feedback control routine according to the first and second embodiments of the present invention.
Figure 3:
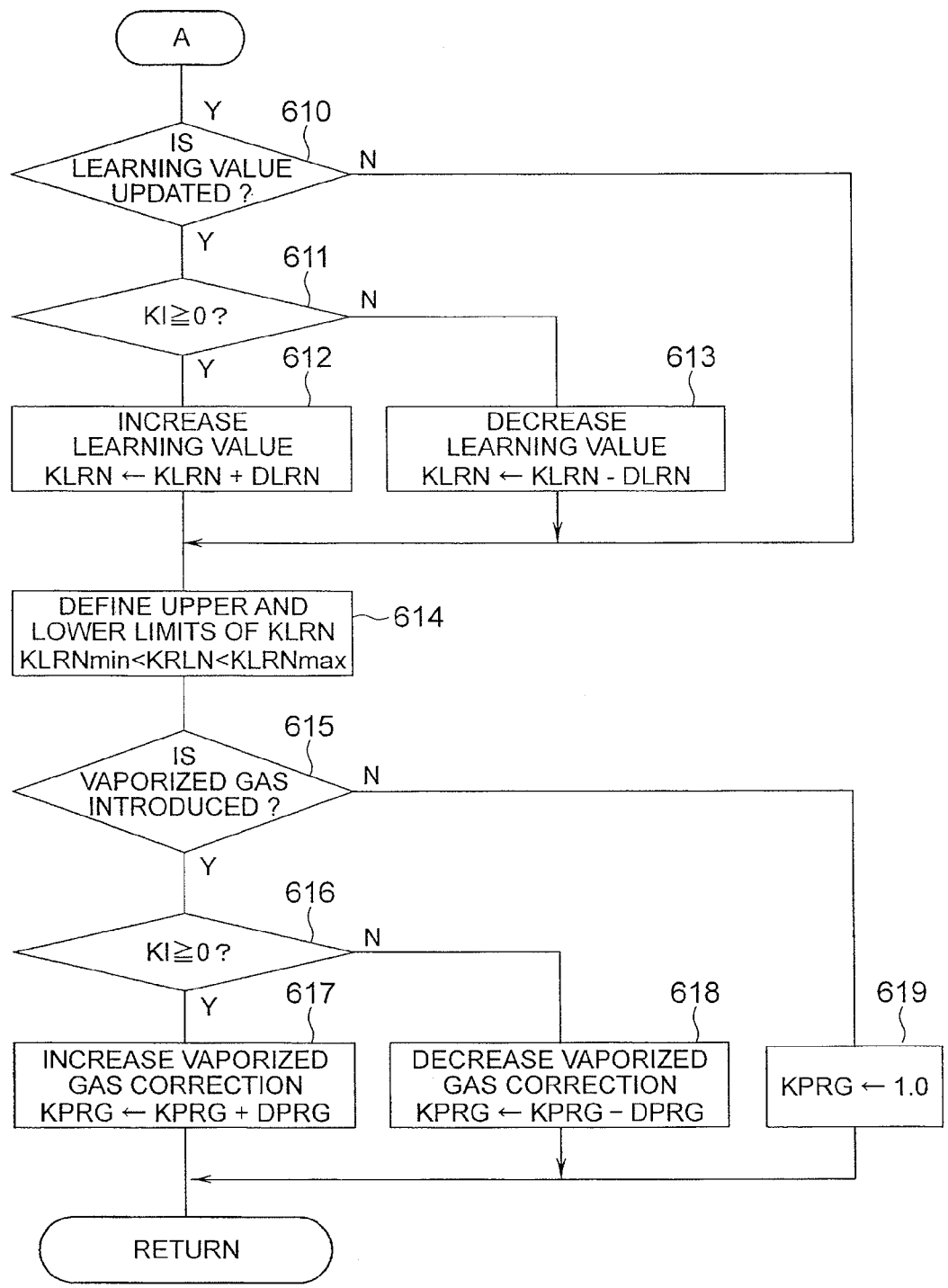
FIG. 3 is a flowchart following the flowchart of FIG. 2.

FIGS. 2 and 3 illustrate an air-fuel ratio feedback control routine of calculating an air-fuel ratio feedback correction coefficient KFB under air-fuel ratio feedback control performed by using the oxygen concentration sensor 29. The air-fuel ratio feedback control routine is executed at every predetermined time interval, for example, 5 ms. In FIGS. 2 and 3, symbols "Y" and "N" at branched portions from each determination process represent determination results "Yes" and "No" of the determination process, respectively.

In FIG. 2, first, in Step 601, an output voltage V1 of the oxygen concentration sensor 29 is taken in after being subjected to A/D conversion.

In Step 602, it is determined whether a closed-loop (feedback: F/B) condition of the air-fuel ratio detected by the oxygen concentration sensor 29 is satisfied. For example, under air-fuel ratio control conditions other than theoretical air-fuel ratio control, in a case where the oxygen concentration sensor is in an inactive state, or in a case where the oxygen concentration sensor 29, a closed-loop condition is not satisfied, and in the other cases, the closed-loop condition is satisfied. Examples of the air-fuel ratio control conditions other than the theoretical air-fuel ratio control include conditions "during enriching control at low cooling water temperature", "during enriching control for an increase in high-load power", "during leaning control for improvement of fuel efficiency", "during leaning control after starting", and "during fuel cut". When it is determined in a calculation routine for alcohol concentration estimation described later that open-loop control is inhibited, even under the air-fuel ratio control conditions other than the theoretical air-fuel ratio control, it is determined that a closed-loop condition is satisfied when the oxygen concentration sensor is in an active state and does not fail.

In the case where the closed-loop condition is not satisfied, the control process proceeds to Step 608 where the air-fuel ratio feedback correction coefficient KFB is adjusted to 1.0. Then, in Step 609, an integral calculation value KI is reset to 0.0.

On the other hand, when the closed-loop condition is satisfied, feedback control according to proportional and integral arithmetic calculations is carried out in Steps 603 through 606. In Step 603, the output voltage V1 (detected air-fuel ratio) of the oxygen concentration sensor 29 is compared with a target voltage VF1 (set in the vicinity of the theoretical air-fuel ratio) so that a rich/lean determination is made. When V1 is larger than VF1 and hence the detected air-fuel ratio is rich, the control process proceeds to Step 604, whereas when V1 is smaller than VF1 and hence the detected air-fuel ratio is lean, the control process proceeds to Step 605.

When the detected air-fuel ratio is rich, then in Step 604, the integral calculation value KI and a proportional calculation value KP are decreased so as to reduce the amount of fuel to be injected.

$$KI \leftarrow KI-DI$$

$$KP \leftarrow -DP$$

A gain DI for the integral calculation value KI and a gain DP for the proportional calculation value KP are set to appropriate values for each operating condition of the engine 10 in such a manner that good feedback performance can be obtained.

On the other hand, when the detected air-fuel ratio is lean, then in Step 605, the integral calculation value KI and the proportional calculation value KP are increased so as to increase the amount of fuel to be injected.

$$KI \leftarrow KI+DI$$

$$KP \leftarrow +DP$$

Next, in Step 606, the air-fuel ratio feedback correction coefficient KFB is calculated.

$$KFB \leftarrow 1.0+KI+KP$$

Thereafter, the control process proceeds to Step 607 where processing of defining an upper limit and a lower limit of the air-fuel ratio feedback correction coefficient KFB is performed.

$$KFB\text{min} < KFB < KFB\text{max}$$

By processing in this manner, an excessively large fuel operation can be prevented, thereby making it possible to prevent deterioration in drivability.

Next, in FIG. 3, from Step 610 to Step 614, a learning value of the air-fuel ratio feedback correction coefficient KFB and a learning correction coefficient KLRN are calculated. Such learning control is performed so as to compensate for the changes over time and production fluctuation of the fuel supply devices. For example, such compensation is carried out for the change in characteristic of the amount of injection of the injectors 21, an error in detected amount of air of the air flow meter 33, and the like. In a case where there is no such characteristic change, the center of the air-fuel ratio feedback correction coefficient KFB is designed to be equal to 1.0, but as the characteristic change occurs, the air-fuel ratio feedback correction coefficient KFB deviates from 1.0. The learning control serves to compensate for this deviation from 1.0 of the air-fuel ratio feedback correction coefficient KFB by means of the learning value and the learning correction coefficient KLRN so as to keep the center of the air-fuel ratio feedback correction coefficient KFB to 1.0.

In Step 610, it is determined whether a condition of updating the learning correction coefficient KLRN is satisfied. Such an update permission condition includes the above-mentioned condition "during the air-fuel ratio feedback control", "the condition for the engine cooling water temperature", the condition "at the time when the vaporized gas is not being introduced", and the condition "at the time when the alcohol concentration is not changing". The condition "at the time when the alcohol concentration is not changing", determines, when a learning value update permission flag FFBLRN to be described later is 1, that the update of the learning correction coefficient KLRN is permitted. When the update is permitted, the control process proceeds to Step 611, whereas it is inhibited, the control process proceeds to Step 614.

In Step 611, it is determined whether the integral calculation value KI is equal to or larger than 0. When KI is equal to or larger than 0, the control process proceeds to Step 612, whereas when smaller than 0, the control process proceeds to Step 613. When KI is equal to or larger than 0, it is indicated that the amount of injection by each of the fuel supply devices is decreased, and in Step 612, the learning correction coefficient KLRN is increased by an update gain DLRN.

$$KLRN \leftarrow KLRN+DLRN$$

On the other hand, when KI is smaller than 0, in Step 613, the learning correction coefficient KLRN is decreased by the update gain DLRN.

$$KLRN \leftarrow KLRN-DLRN$$

DLRN is set sufficiently smaller than the above-mentioned update gain DI for the integral calculation value KI to prevent change speed of KLRN from becoming excessively high compared with that of KFB. KLRN is held for each of operation conditions delimited by engine r.p.m. and load to adsorb a tendency difference of characteristic fluctuation due to the operation conditions.

The learning correction coefficient KLRN may be updated by using a value obtained by subjecting the air-fuel ratio feedback correction coefficient KFB to filter processing or moving averaging processing.

Then, the control process proceeds to Step 614 where processing of defining an upper limit and a lower limit of the learning correction coefficient KLRN is performed.

$$KLRN\text{min} < KLRN < KLRN\text{max}$$

An excessively large fuel operation can be prevented by the above-mentioned calculation processing, thereby making it possible to prevent deterioration in drivability. In addition, when KLRN reaches the upper or lower limit, there is a possibility that some trouble might have occurred in the fuel supply system, and hence KLRN is used for failure determination.

Next, from Step 615 to Step 620, a vaporized gas introduction correction coefficient KPRG for compensating for the change in air-fuel ratio due to the vaporized gas introduced into the intake pipe is calculated.

In Step 615, it is determined whether a condition for introducing the vaporized gas is satisfied. When the vaporized gas is being introduced, the control process proceeds to Step 616, whereas when the vaporized gas is not being introduced, the control process proceeds to Step 619 where the KPRG is reset to 1.0, and the calculation routine is ended. The condition for introducing the vaporized gas permits introduction when an introduction inhibition flag FALPRG during alcohol concentration change, which is described later, is 0 and inhibits introduction when the introduction inhibition flag FALPRG is 1.

In Step 616, it is determined whether the integral calculation value KI is equal to or larger than 0. When KI is equal to or larger than 0, the control process proceeds to Step 617, whereas when KI is smaller than 0, the control process proceeds to Step 618. When KI is equal to or larger than 0, it is indicated that the fluctuation in lean air-fuel ratio is caused by the introduction of the vaporized gas, and hence in Step 617, the vaporized gas introduction correction coefficient KPRG is increased by an update gain DPRG. When, on the other hand, KI is smaller than 0, then in Step 618, the vaporized gas introduction correction coefficient KPRG is decreased by the update gain DPRG.

A fuel injection amount Qfuel1 supplied from the injector 21 to the engine 10 is set as indicated by the following expression by using a basic injection amount Qfuel0 at alcohol concentration of 0%, an alcohol concentration correction coefficient KAL, the air-fuel ratio feedback correction coefficient KFB, the learning correction coefficient KLRN, and the vaporized gas introduction correction coefficient KPRG (all of which are described later):

$$Qfuel1 = Qfuel0 \times KAL \times KFB \times KLRN \times KPRG$$

The basic injection amount Qfuel0 is calculated as indicated by the following expression by using an actual supply air amount Qacyl to the engine 10 calculated based on the intake air amount qa, which is detected by the air flow meter 33, and a target air-fuel ratio AF0:

$$Qfuel0 = Qacyl/AF0$$

Figure 4:
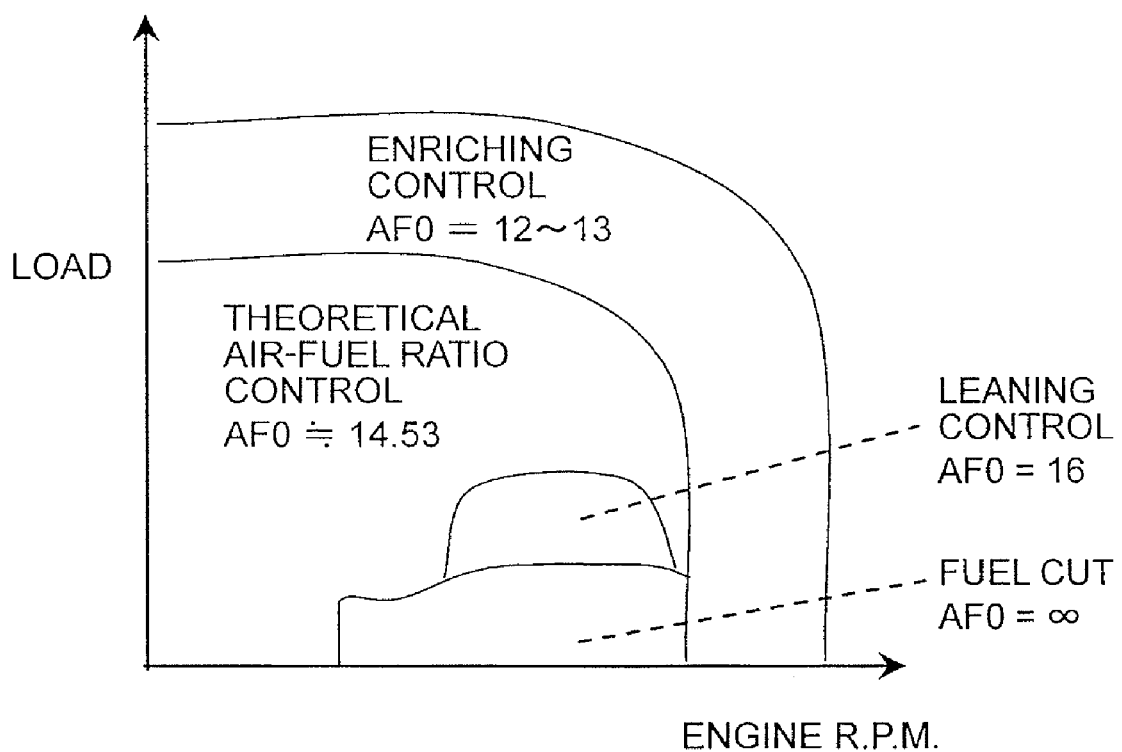
FIG. 4 is an explanatory diagram illustrating a three-dimensional map for target air-fuel ratio setting of air-fuel ratio feedback control according to the first and second embodiments of the present invention.

The target air-fuel ratio AF0 is an air-fuel ratio at alcohol concentration of 0%. As illustrated in FIG. 4, the target air-fuel ratio AF0 is set to a value based on a three-dimensional map of engine r.p.m. and load (e.g., the intake air amount qa).

In FIG. 4, when the engine r.p.m. or the load is large, the target air-fuel ratio AF0 for enriching control (=12 to 13) is set and, in an intermediate operation region, the target air-fuel ratio AF0 for theoretical air-fuel ratio control ($\approx$14.53) is set. When the engine r.p.m. is in the intermediate operation region and the load is small, the target air-fuel ratio AF0 for leaning control (=16) or the target air-fuel ratio AF0 for fuel cut)(=∞) is set.

Figure 5:
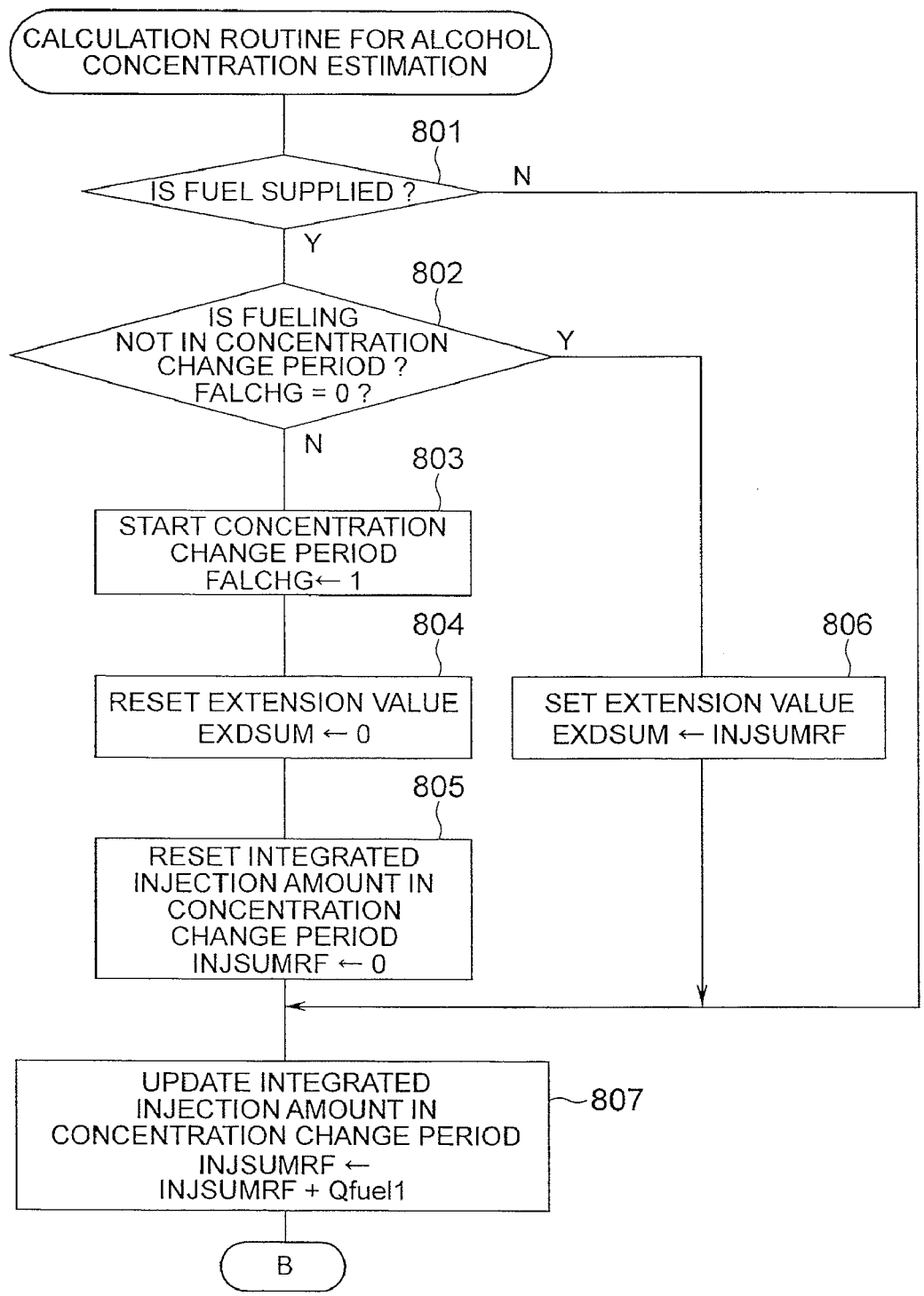
FIG. 5 is a flowchart illustrating a calculation routine for alcohol concentration estimation according to the first embodiment of the present invention.
Figure 6:
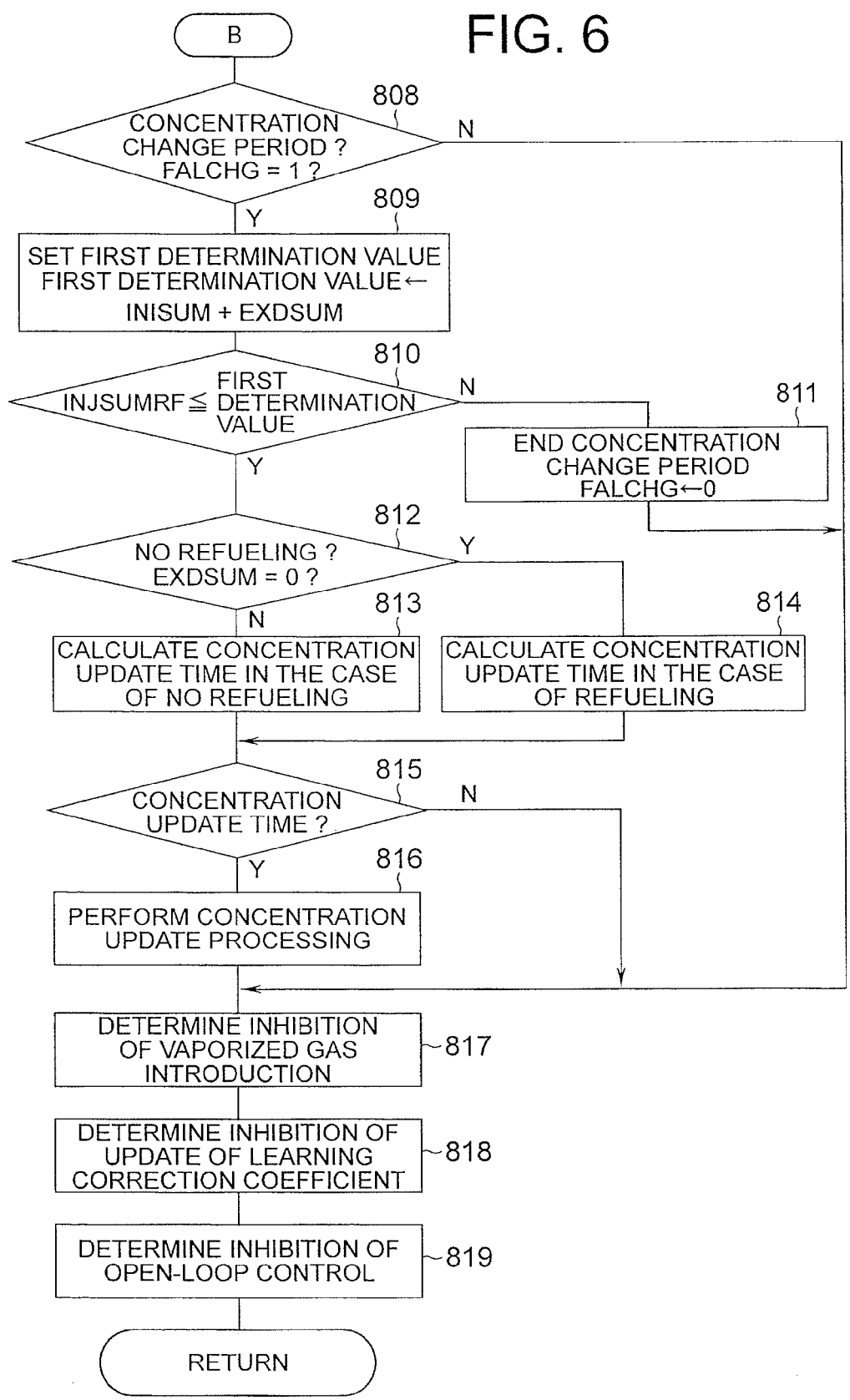
FIG. 6 is a flowchart following the flowchart of FIG. 5.

FIGS. 5 and 6 illustrate a calculation routine for alcohol concentration estimation as concentration estimation means for updating the alcohol concentration correction coefficient KAL based on the fluctuation in air-fuel ratio feedback correction coefficient KFB. The calculation routine is executed at every predetermined time interval, for example, 5 ms.

In FIG. 5, first, in Step 801, it is determined, based on, for example, a change in detection signal of the fuel level gauge 9 in the fuel tank 20, whether the fuel is supplied to the fuel tank 20. When it is determined that the fuel is not supplied (No), the control process proceeds to Step 807.

It is determined, according to reset processing of the ECU 35, that the fuel is supplied even when stored values of various control coefficients such as the alcohol concentration correction coefficient KAL are initialized. This makes it possible to start concentration estimation after the reset of the ECU 35 and prevent a deficiency due to a concentration estimation error.

When it is determined that the fuel level gauge 9 fails, it may be regarded that the fuel is supplied during the stop of the engine 10 as fail-safe and determined that the fuel is supplied at the time of the start of the engine 10. This makes it possible to start concentration estimation even at the time of the failure of the fuel level gauge 9 and prevent a deficiency due to an error of concentration estimation. Alternatively, it may be determined that the fuel is supplied at the time of the starting even if the fuel level gauge 9 is not in failure. Alternatively, the fueling determination may be performed according to any one of publicly-known fueling determination methods or a combination of the fueling determination methods.

When it is determined in Step 801 that the fuel is supplied and when it is determined in Step 802 that the fueling is not in a concentration change period, the control process proceeds to Step 803 and processing of starting the concentration change period is performed. When it is determined that the fueling is in the concentration change period, the control process proceeds to Step 806 and processing of extending the concentration change period is performed. The concentration change period is a period in which a change in alcohol concentration in dead time and a first order delay after fueling occurs. When it is determined that the fuel is supplied, if the fueling is not in the concentration change period, the concentration change period is started anew and, if the fueling is already in the concentration change period, end time of the concentration change period is extended.

When a concentration change period flag FALCHG is "0" in Step 802, it is determined that the fueling is not in the concentration change period and the control process proceeds to Step 803. Then, the concentration change period flag FALCHG is set to 1 and the concentration change period is started.

Subsequently, in Step 804, an extension value EXDSUM of the concentration change period is reset to "0". Subsequently, an integrated injection amount INJSUMRF after the start of the concentration change period is reset to "0".

On the other hand, when it is determined in Step 802 that the fueling is in the concentration change period, in Step 806, the extension value EXDSUM of the concentration change period is set to the integrated injection amount INJSUMRF after the start of the concentration change period.

$$EXDSUM \leftarrow INJSUMRF$$

A concentration change in the injector 21 which occurs when refueling is performed during the concentration change is, as illustrated in FIGS. 22A to 22C and 23A and 23B described above, superimposition of an alcohol concentration change in the injector 21 in dead time and a first order delay with respect to an alcohol concentration change in the fuel tank 20 due to the initial fueling and a concentration change in the injector 21 in the dead time and the first order delay with respect to an alcohol concentration change in the fuel tank 20 due to the refueling. End time of the concentration change is extended according to the end time of the concentration change due to the initial fueling. However, the extended period is a period equivalent to an integrated injection amount from the initial fueling to the refueling.

Therefore, the extension value EXDSUM is set to the integrated injection amount INJSUMRF after the start of the concentration change period which is equal to an integrated injection amount from the time point of the initial fueling determination when the concentration change period is started to the present time point when the refueling determination is made.

Therefore, it is possible to extend the concentration change period to the end time of the concentration change due to the refueling. This makes it possible to set a concentration change period corresponding to the concentration change of the initial fueling and the refueling and improve alcohol concentration estimation accuracy.

Figure 23A:
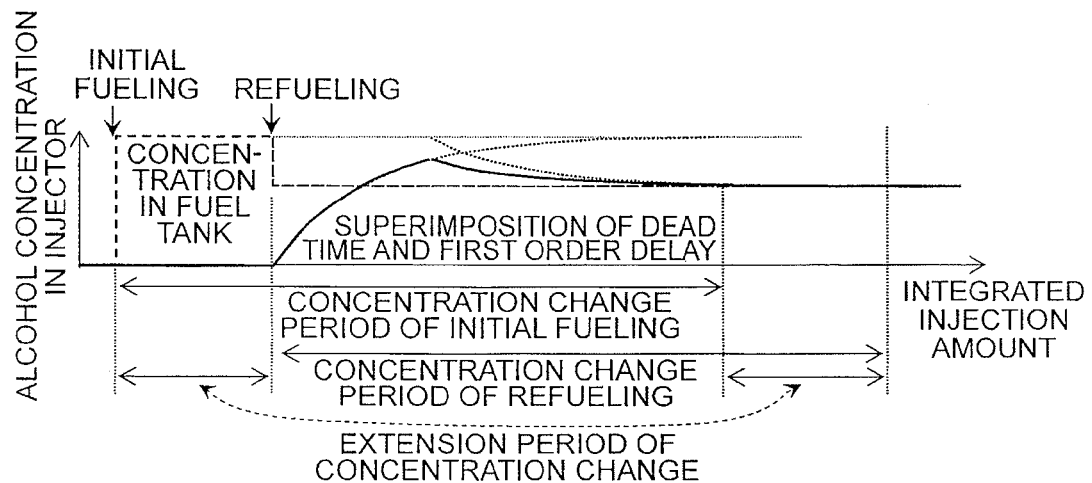
FIGS. 23A and 23B are waveform charts illustrating a delay in the alcohol concentration change which occurs when the refueling is performed during the alcohol concentration change.
Figure 23B:
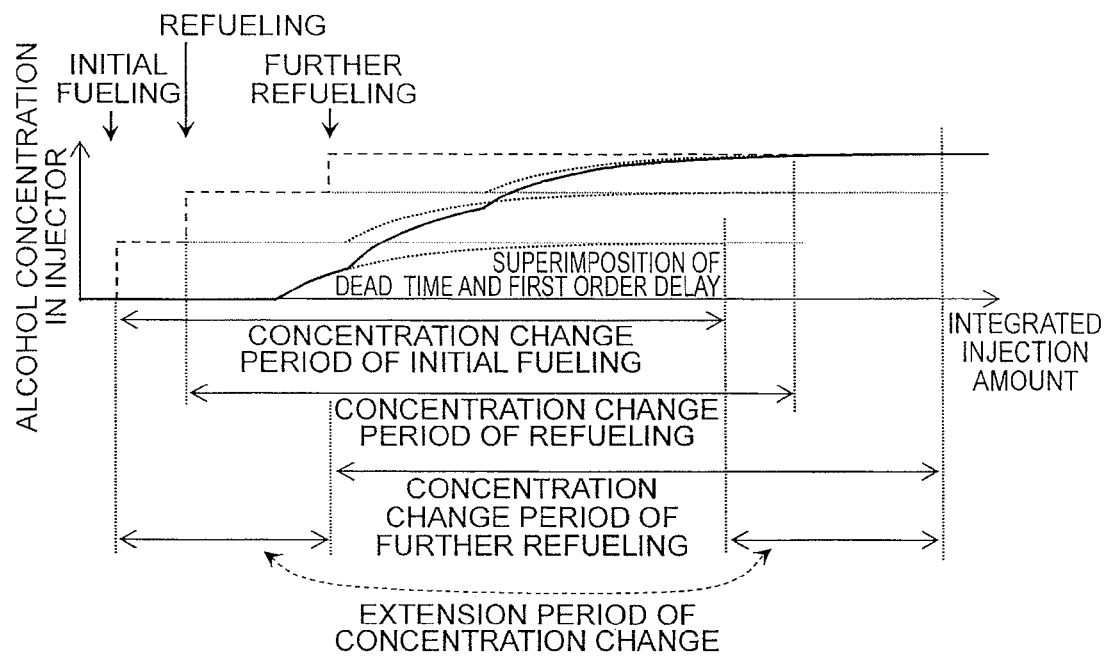

As illustrated in FIG. 23B, even when refueling determination is made a plurality of times in the concentration change period, EXDSUM is set in each time of the refueling determination, and hence it is possible to extend the concentration change period to end time of the concentration change due to the last refueling determination.

Subsequently, when the fuel is injected and supplied from the injector 21 in Step 807, the fuel injection amount Qfuel1 is added to the integrated injection amount INJSUMRF after the start of the concentration change period.

$$INJSUMRF \leftarrow INJSUMRF + Qfuel1$$

The control process proceeds to FIG. 6. When it is determined in Step 808 that the fueling is in the concentration change period (FALCHG=1), the control process proceeds to Step 809 and a series of concentration estimation processing is performed. In Step 809, a first determination value used for determination of end time of the concentration change period is calculated based on an initial value INISUM and the extension value EXDSUM.

$$\text{First determination value} \leftarrow INISUM + EXDSUM$$

Figure 21:
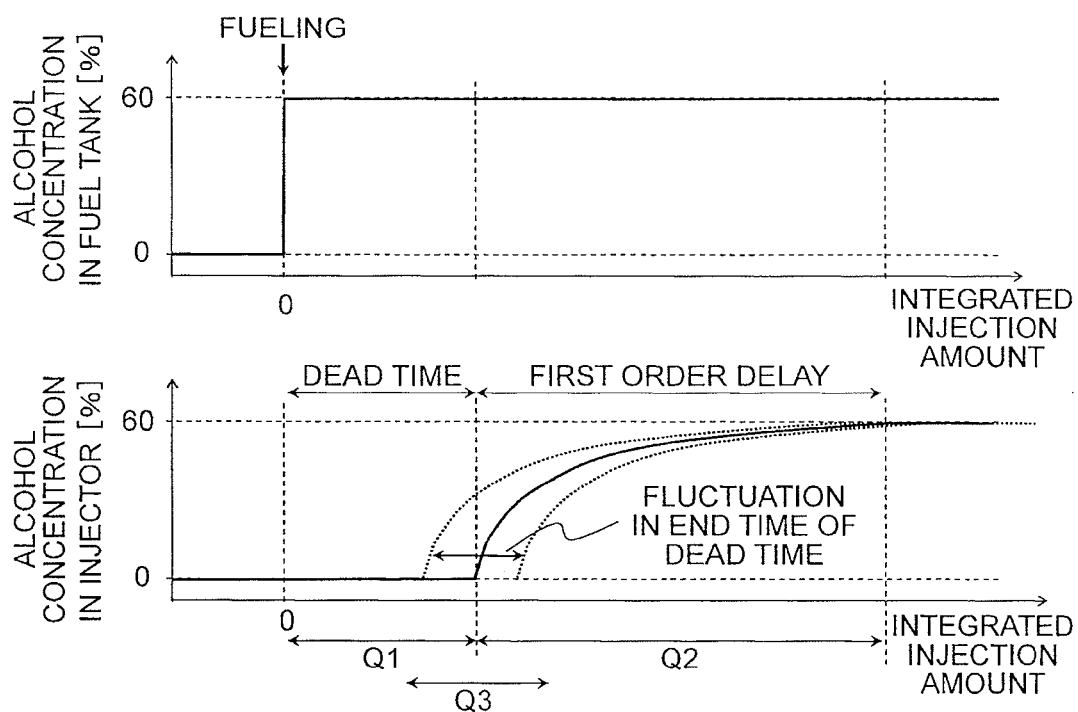
FIG. 21 is a waveform chart illustrating a delay in an alcohol concentration change in the control apparatus for an internal combustion engine.
Figure 22A:
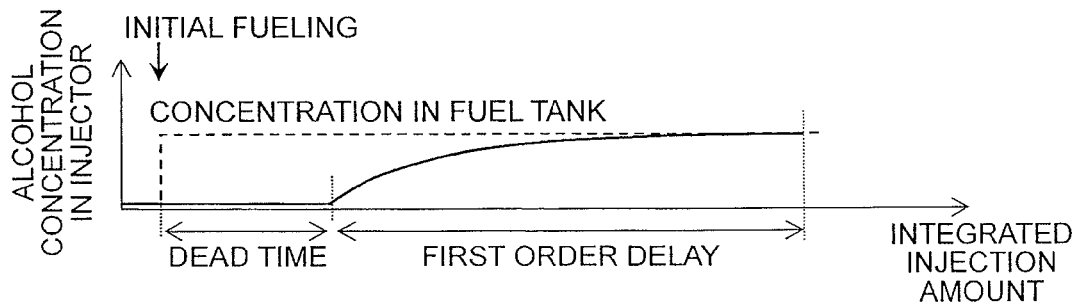
FIGS. 22A to 22C are waveform charts illustrating a delay in the alcohol concentration change which occurs when refueling is performed during the alcohol concentration change.
Figure 22B:
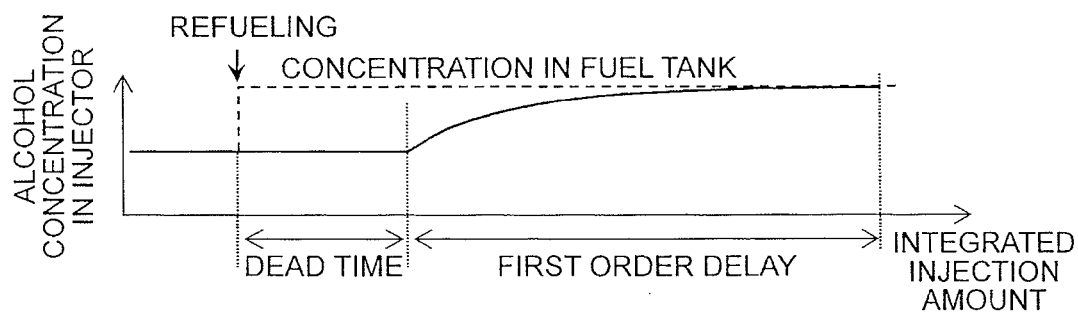
Figure 22C:
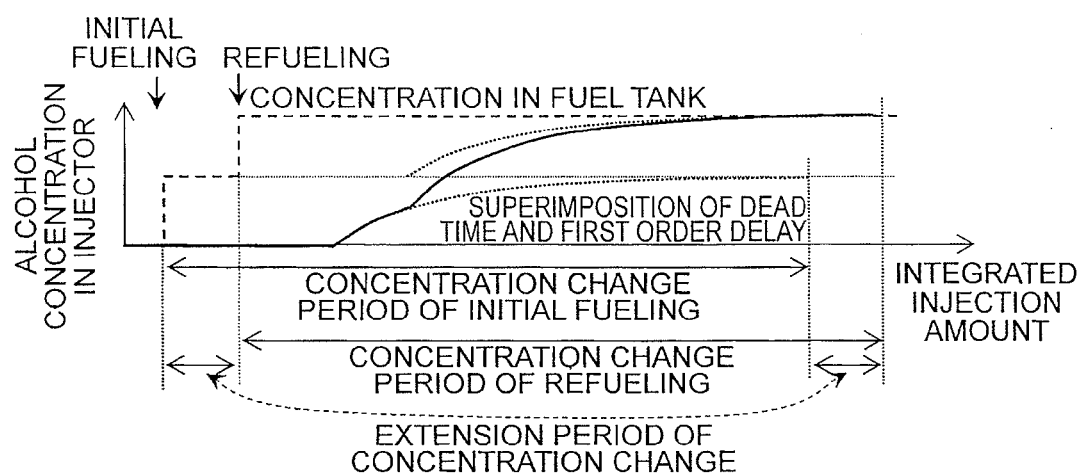

The initial value INISUM is set to a value equivalent to an integrated injection amount "Q1+Q2" in the concentration change period of the dead time and the first order delay after the initial fueling in FIG. 21. EXDSUM is the extension value of the above-mentioned concentration change period due to the refueling, and hence the first determination value is set to an integrated injection amount in a period from a time point when the initial fueling is performed to a time point when the concentration change due to the refueling ends.

Subsequently, when it is determined in Step 810 that the integrated injection amount INJSUMRF after the start of the concentration change period exceeds the first determination value, FALCHG is set to "0" and the concentration change period is ended.

In Step 812, it is determined whether the refueling determination is made in the concentration change period. It can be determined, based on the extension value EXDSUM of the concentration change period, whether the refueling determination is made. When the extension value EXDSUM is 0, it is determined that the refueling determination is not made and the control process proceeds to Step 812. Concentration update time in the case in which the refueling determination is not made is set. When EXDSUM is other than 0, it is determined that the refueling determination is made and the control process proceeds to Step 814. Concentration update time in the case in which the refueling determination is made is set.

To exclude a case in which the fueling determination is continuously made in a short period, a dead zone may be provided. For example, in the case of "EXDSUM>predetermined value", it is regarded that the refueling determination is made and the control process proceeds to Step 814. In the case of "EXDSUM<=predetermined value", it is regarded that the refueling determination is not made and the control process proceeds to Step 813. When EXDSUM is sufficiently small compared with an integrated injection amount in the concentration change period in the dead time and the first order delay, even if a concentration change is caused by refueling, the concentration change is substantially a change in the dead time and the first order delay. Therefore, it is possible to set appropriate concentration update time even if the concentration update time is not switched.

In the concentration update time, it is necessary to perform inhibition of vaporized gas introduction described later and inhibition of the stop of air-fuel ratio feedback control. Therefore, these functions of controls other than concentration estimation are degraded. Therefore, it is possible to minimize the degradation in functions by discretely setting update time according to the behavior of a concentration change. Further, by changing the discretely set update time according to presence or absence of refueling, it is possible to set the concentration update time suitable for the behavior of a concentration change due to presence or absence of refueling and minimize a concentration estimation error while minimizing the degradation in functions of the other controls.

In Step 813, concentration update time in the case in which the refueling determination is not made is set. The update time is calculated based on the integrated injection amount INJSUMRF after the start of the concentration change period according to two-dimensional map data illustrated in FIG. 7. A period Q4 after the start of the concentration change period is equivalent to a period of the dead time, and hence a concentration change does not occur, with the result that concentration update is not performed. For a short while after the start of a concentration change in the first order delay, concentration change speed is high, and hence the concentration update is permitted to make it possible to follow the concentration change. Thereafter, a stop interval of the concentration update is set gradually long. However, the concentration change speed in the first order delay gradually decreases, and hence it is possible to follow the concentration change.

In Step 814, concentration update time in the case in which the refueling determination is made is set. The update time is calculated according to two-dimensional map data illustrated in FIG. 8A as in FIG. 7. A concentration change in the case in which the refueling is performed is superimposition of a concentration change in the dead time and the first order delay due to the initial fueling and a concentration change in the dead time and the first order delay due to the refueling, and hence the behavior of the concentration change after the dead time in the initial refueling is not a simple first order delay and is a more complicated behavior. Therefore, it is possible to follow the complicated concentration change by setting a stop interval of the concentration update after the lapse of the period Q4 equivalent to the dead time in the initial fueling short. A setting period of INJSUMRF is set longer to make it possible to deal with a case where the extended period is longer.

Alcohol concentration is superimposition of the concentration change in the dead time and the first order delay due to the initial fueling and the concentration change in the dead time and the first order delay due to the refueling. Therefore, an integrated injection amount after the initial fueling determination and an integrated injection amount after the refueling determination are calculated as illustrated in FIG. 8B rather than FIG. 8A. It is also possible to set the integrated injection amount after the fueling determination as the abscissa of FIG. 7, calculate respective concentration update times in the cases of the initial fueling determination and the refueling determination using the integrated injection amount after the initial fueling determination and the integrated injection amount after the refueling determination, and superimpose both the update times to permit concentration update when update is permitted in any one of the update time after the initial fueling determination and the update time after the refueling determination. When the refueling determination is made a plurality of times, update times corresponding to the respective refueling determinations are calculated and superimposed.

When the concentration update time is calculated in Step 813 or Step 814, the alcohol concentration correction coefficient KAL equivalent to an alcohol concentration estimation value is updated in Step 816 through determination of the concentration update time in Step 815. A value of "KAL×(1+K1)" based on the present alcohol concentration correction coefficient KAL and the integral term KI of the air-fuel ratio feedback correction coefficient is equivalent to a true alcohol concentration correction coefficient for compensating for the present concentration value from alcohol concentration of 0%. Therefore, KAL is updated as indicated by the following expression:

$$KAL \leftarrow KAL \times (1+KI)$$

According to the update of KAL, the fluctuation in KI is reflected on KAL, and hence KI is reset to "0".

Step 815 corresponds to concentration update permitting means for permitting concentration update in the concentration change period. The time when the concentration update is permitted is set according to an integrated injection amount after the start of the concentration change period, and, when the fueling determination is made and the fueling is in the concentration change period, a set value of the update permission time is changed.

Figure 9:
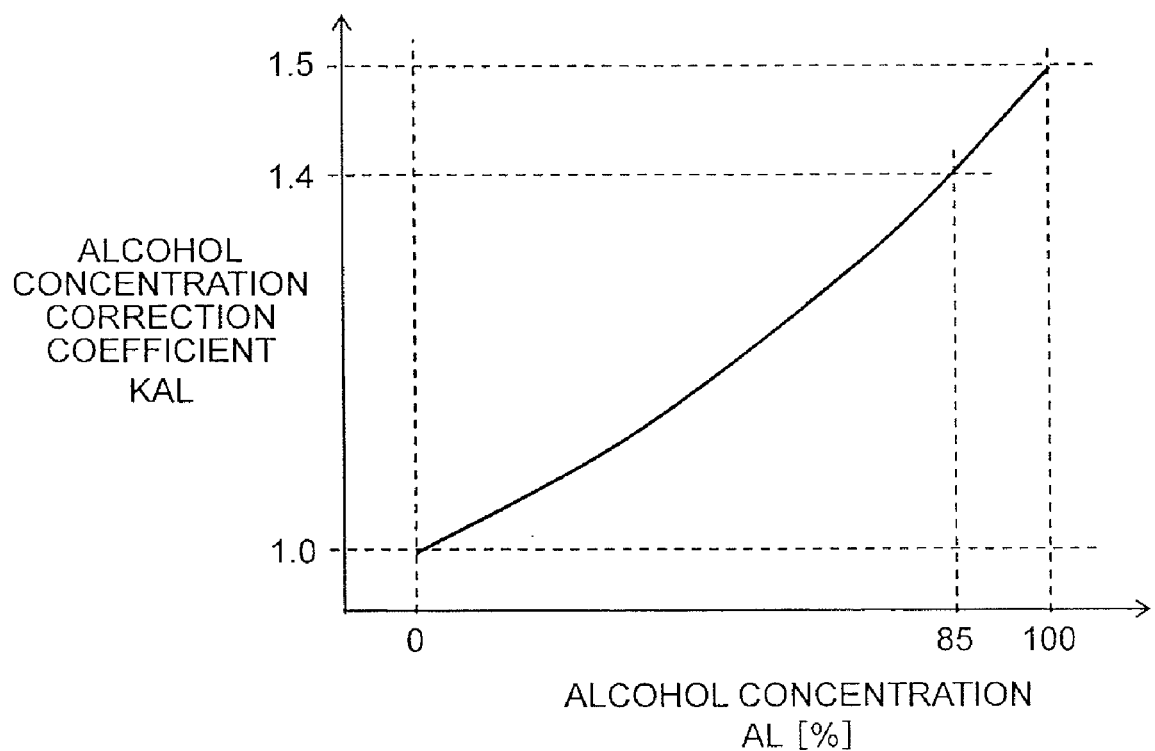
FIG. 9 is an explanatory diagram illustrating a two-dimensional map for setting of the alcohol concentration estimation value according to the first and second embodiments of the present invention.

The alcohol concentration estimation value AL is updated by using a characteristic map of the alcohol concentration correction coefficient KAL and the alcohol concentration AL illustrated in FIG. 9. The alcohol concentration estimation value AL is used for various kinds of fuel control, ignition control, and the like. The fuel control includes fuel control at the time of the start of the engine 10. The ignition control includes ignition time calculation and calculation of a control constant concerning knock control. The integral term KI always fluctuates according to feedback and the concentration estimation value also fluctuates. Therefore, a term obtained by applying filter processing or moving average processing to KI may be used for the update of the concentration estimation value.

In Step 817, it is determined whether a condition for inhibiting vaporized gas introduction is satisfied. When the concentration update time is calculated in Step 813 or Step 814, introduction of the vaporized gas is inhibited. When the vaporized gas introduction is inhibited, the introduction inhibition flag FALPRG is set to "1". When the vaporized gas introduction is not inhibited, the introduction inhibition flag FALPRG is set to "0". It is possible to prevent fluctuation in air-fuel ratio feedback correction coefficient KFB due to vaporized gas introduction. The alcohol concentration estimation accuracy is improved.

However, if the introduction of the vaporized gas is always inhibited to reduce an introduction amount of the vaporized gas in the concentration change period, adsorption ability of a canister for adsorbing the vaporized gas is exceeded. Hence, there is a risk that the vaporized gas is emitted to the atmosphere and causes atmospheric pollution. Because of agitation of the fuel due to fueling, supply of new fuel which tends to generate the vaporized gas, or the like, the vaporized gas is particularly often generated after the fueling. Therefore, it is necessary to introduce the vaporized gas.

Figure 7:
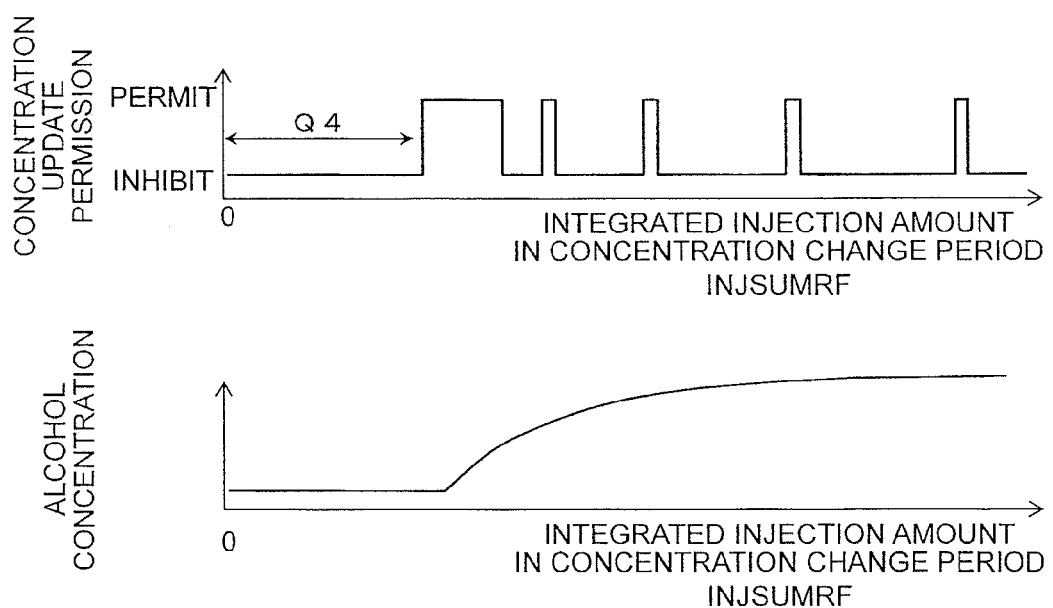
FIG. 7 is an explanatory diagram illustrating a two-dimensional map for update permission time setting for an alcohol concentration estimation value according to the first embodiment of the present invention.
Figure 8A:
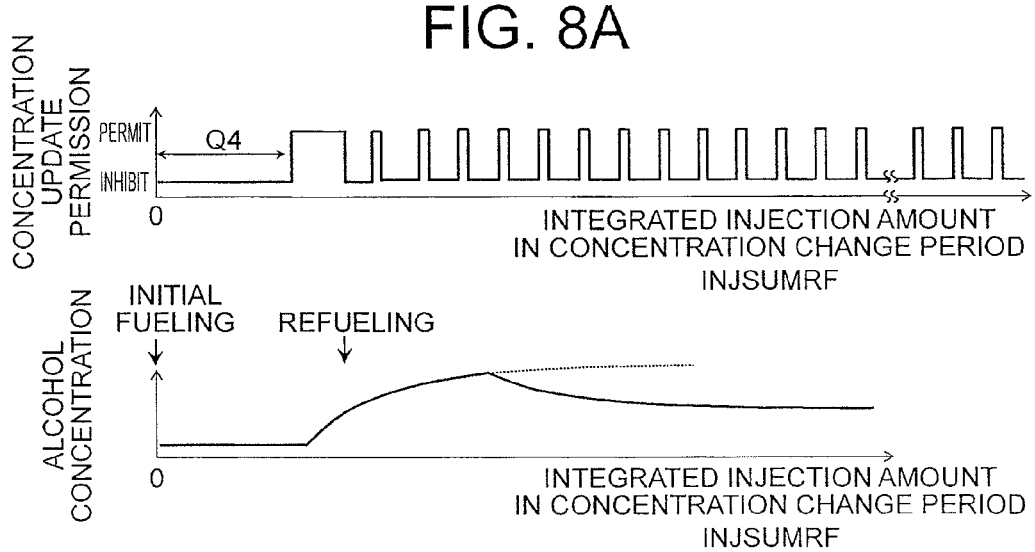
FIGS. 8A and 8B are explanatory diagrams illustrating two-dimensional maps for the update permission time setting for the alcohol concentration estimation value according to the first embodiment of the present invention.
Figure 8B:
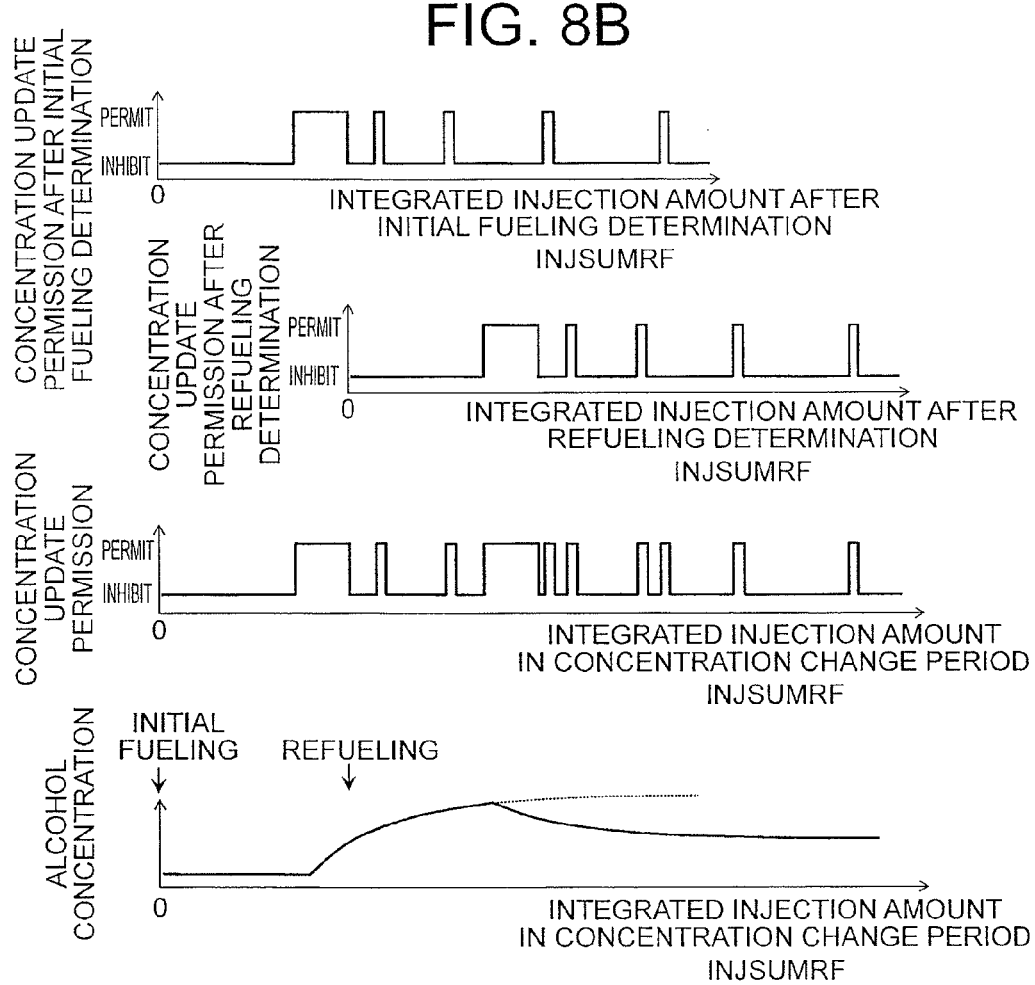

Therefore, even in the concentration change period, as illustrated in FIG. 7 or FIGS. 8A and 8B, the introduction of the vaporized gas is inhibited according to the behavior of a concentration change due to presence or absence of refueling only in time when concentration update is necessary. This makes it possible to prevent atmospheric pollution irrespectively of presence or absence of refueling and at the same time prevent degradation in alcohol concentration estimation accuracy.

In Step 818, it is determined whether a condition for inhibiting update of a learning value of the learning correction coefficient KLRN of the air-fuel ratio feedback correction coefficient is satisfied. When the fueling is in the concentration change period, update of a learning value is inhibited. When the update of the learning value is inhibited, the learning value update permission flag FFBLRN is set to "0" and, when the update of the learning value is not inhibited, the learning value update permission flag FFBLRN is set to "1".

The update of the learning value is inhibited during a concentration change. This makes it possible to prevent fluctuation in air-fuel ratio feedback correction coefficient caused by an alcohol concentration change from being reflected on the update of the learning correction coefficient. The fluctuation is reflected on the update of the alcohol concentration correction coefficient KAL, and hence it is possible to prevent mislearning of a learning value and improve estimation accuracy of alcohol concentration. When refueling is performed, the concentration change period is extended, and hence it is possible to obtain the effect irrespectively of presence or absence of refueling.

In Step 819, a condition for inhibiting air-fuel ratio open-loop control is determined. The air-fuel ratio open-loop control includes enriching control for an increase in high-load power, leaning control for improvement of fuel efficiency, enriching control during low cooling water temperature, and leaning control after starting, as air-fuel ratio control other than the above-mentioned theoretical air-fuel ratio control.

When the concentration update time is calculated in Step 813 or 814, the air-fuel ratio open-loop control is inhibited.

The air-fuel ratio open-loop control is inhibited, the air-fuel ratio feedback control is surely performed to calculate the air-fuel ratio feedback correction coefficient KFB, and alcohol concentration estimation is carried out, with the result that the alcohol concentration estimation accuracy is improved.

However, when the air-fuel ratio open-loop control is always inhibited in the concentration change period, there is a risk that an original function of open-loop control is significantly spoiled.

Therefore, even in the concentration change period, as illustrated in FIG. 7 or FIGS. 8A and 8B, the air-fuel ratio open-loop control is inhibited according to the behavior of a concentration change due to presence or absence of refueling only in time when concentration update is necessary. This makes it possible to minimize degradation in function of the open-loop control and at the same time prevent degradation in alcohol concentration estimation accuracy irrespectively of presence or absence of refueling.

Various control constants such as the alcohol concentration correction coefficient KAL, the integrated injection amount INJSUMRF after the start of the concentration change period, the concentration change period flag FALCHG, and the extension value EXDSUM are stored in the backup RAM or the EEPROM in the ECU 35 and designed not to be reset even when the engine 10 is stopped or the power supply to the ECU 35 is turned off. When the backup RAM or the EEPROM is reset, an initial value of the alcohol concentration correction coefficient KAL is set to a correction coefficient corresponding to intermediate alcohol concentration. It is necessary to re-estimate alcohol concentration, and hence, as described above, in Step 801, it is determined that the fuel is supplied and alcohol concentration estimation is forcibly started.

Figure 10:
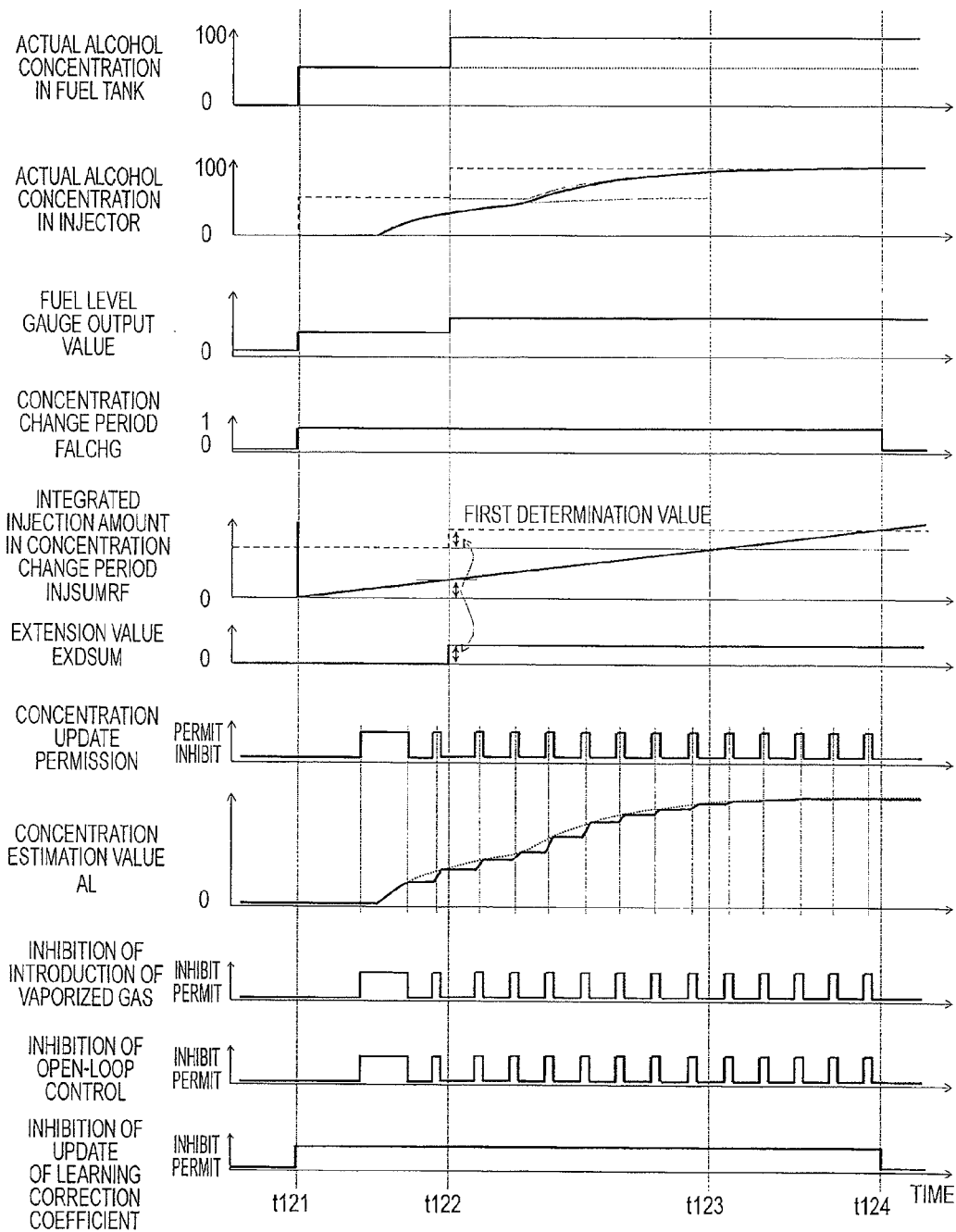
FIG. 10 is a timing chart illustrating alcohol concentration estimation processing according to the first embodiment of the present invention.

Specific behaviors (temporal changes) of parameters according to the first embodiment of the present invention are described below with reference to a timing chart illustrated in FIG. 10. FIG. 10 illustrates processing operation by the calculation routine illustrated in FIGS. 5 and 6 and illustrates temporal changes of the respective parameters in association with one another.

In FIG. 10, behaviors at the time when alcohol concentration before fueling is 0% and alcohol concentration in the fuel tank 20 changes to 50% because of the initial fueling and changes to 80% because of refueling are illustrated. At time t121, high-concentration alcohol fuel is supplied and actual alcohol concentration in the fuel tank 20 changes from 0% to 50%. At time t122, the high-concentration alcohol fuel is supplied again and the actual alcohol concentration in the fuel tank 20 changes from 50% to 80%.

As described above, the actual alcohol concentration in the injector 21 is, because of a fuel delivery delay in the returnless fuel supply system, superimposition of a concentration change in the dead time and the first order delay due to the initial fueling and a concentration change in the dead time and the first order delay due to the refueling. The alcohol concentration change due to the initial fueling ends at time t123. However, end time of the alcohol concentration change due to the refueling is extended to time t124.

At the time t121, it is determined that the fuel is supplied according to a change in the fuel level gauge 9 and, because the fueling is not in the concentration change period, the concentration change period flag FALCHG is set to "1" and the concentration change period is started. The integrated injection amount INJSUMRF after the start of the concentration change period is reset to "0" and fuel injection amounts are integrated. End time of the concentration change period and concentration update permission time are determined based on INJSUMRF.

At the time t122, it is determined that the fuel is supplied again according to a change in the fuel level gauge 9 and, because the fueling is in the concentration change period, the extension value EXDSUM of the first determination value is set to INJSUMRF at the time t122 and the first determination value is increased from the initial value INISUM by an increase in EXDSUM.

When the integrated injection amount INJSUMRF after the start of the concentration change period exceeds the first determination value, the concentration change period is ended. Therefore, the end time of the concentration change period is extended from the time t123 to the time t124.

Therefore, it is possible to extend the concentration change period to the end time of the concentration change due to the refueling, and hence it is possible to set a concentration change period corresponding to the concentration changes due to the initial fueling and the refueling and improve the alcohol concentration estimation accuracy.

A setting map for the concentration update permission time is switched from the setting map in the case of no refueling determination illustrated in FIG. 7 to the setting map in the case of the refueling determination illustrated in FIGS. 8A and 8B at the time t122 because of the refueling determination. Permission of concentration update is determined from the setting map based on INJSUMRF. The concentration estimation value AL is updated when the permission of the concentration update is determined. The concentration update permission time is switched based on the refueling determination, and hence the concentration estimation value AL can follow the more complicated behavior of the concentration change which occurs when the refueling is performed. A concentration estimation error can be minimized.

The introduction of the vaporized gas and the open-loop control are inhibited when the permission of the concentration update is determined, and hence it is possible to improve the concentration estimation accuracy. The concentration update permission time is discretely set according to the behavior of the concentration change, and hence it is possible to minimize degradation in functions of purge introduction and open-loop control. Further, the update inhibition period for the learning correction coefficient is extended from the time t123 to the time t124 based on the refueling determination. Therefore, it is possible to realize prevention of mislearning due to the concentration change due to the refueling and improve the concentration estimation accuracy.

Second Embodiment

In a second embodiment of the present invention, alcohol concentration estimation is started when fluctuation in air-fuel ratio feedback correction coefficient increases after fueling. In the second embodiment, only the calculation routine for alcohol concentration estimation illustrated in FIGS. 5 and 6 is changed from that of the first embodiment, and hence description the same as the description of the first embodiment except the description of FIGS. 5 and 6 is omitted.

Figure 11:
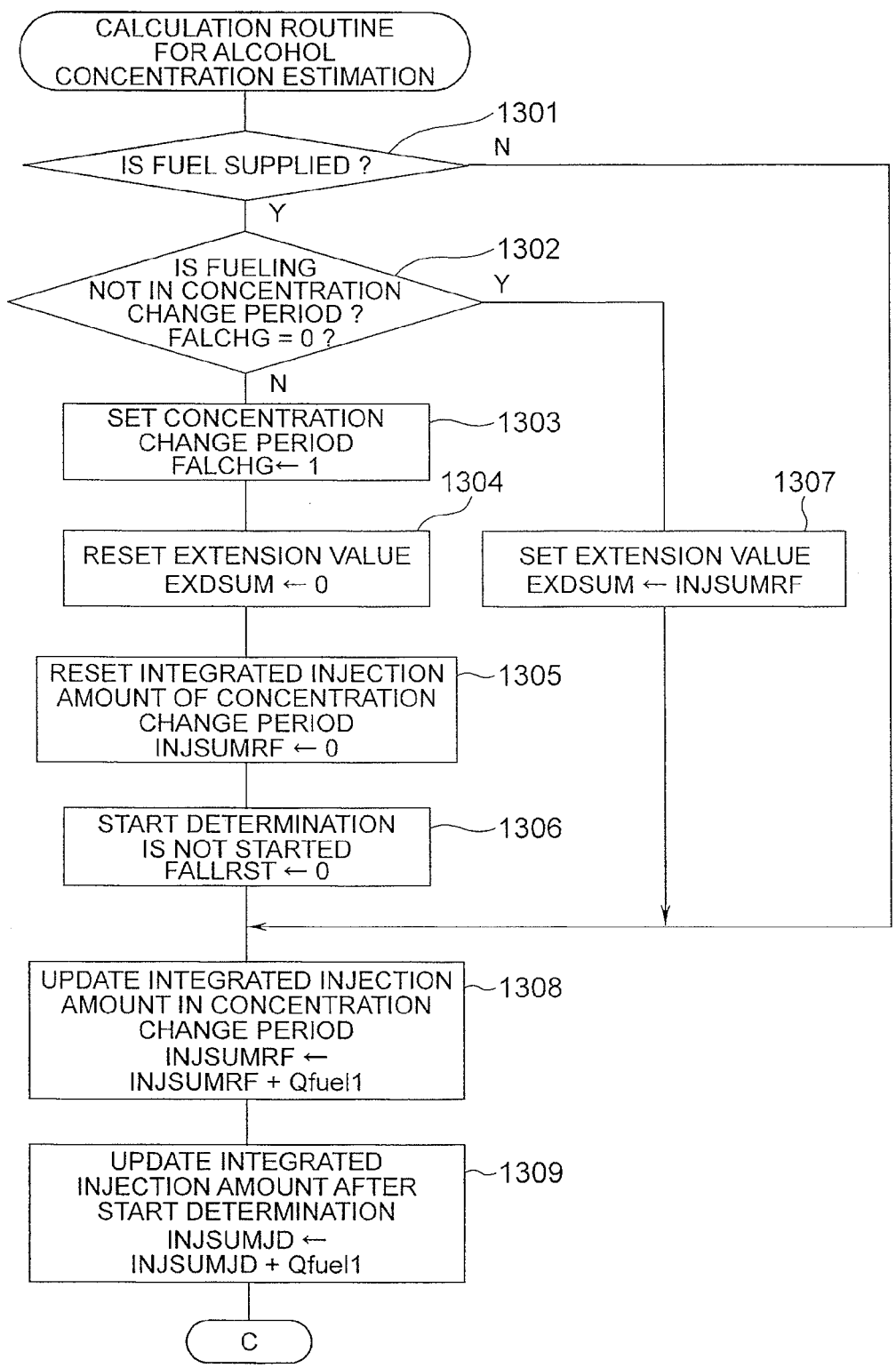
FIG. 11 is a flowchart illustrating a calculation routine for alcohol concentration estimation according to the second embodiment of the present invention.
Figure 12:
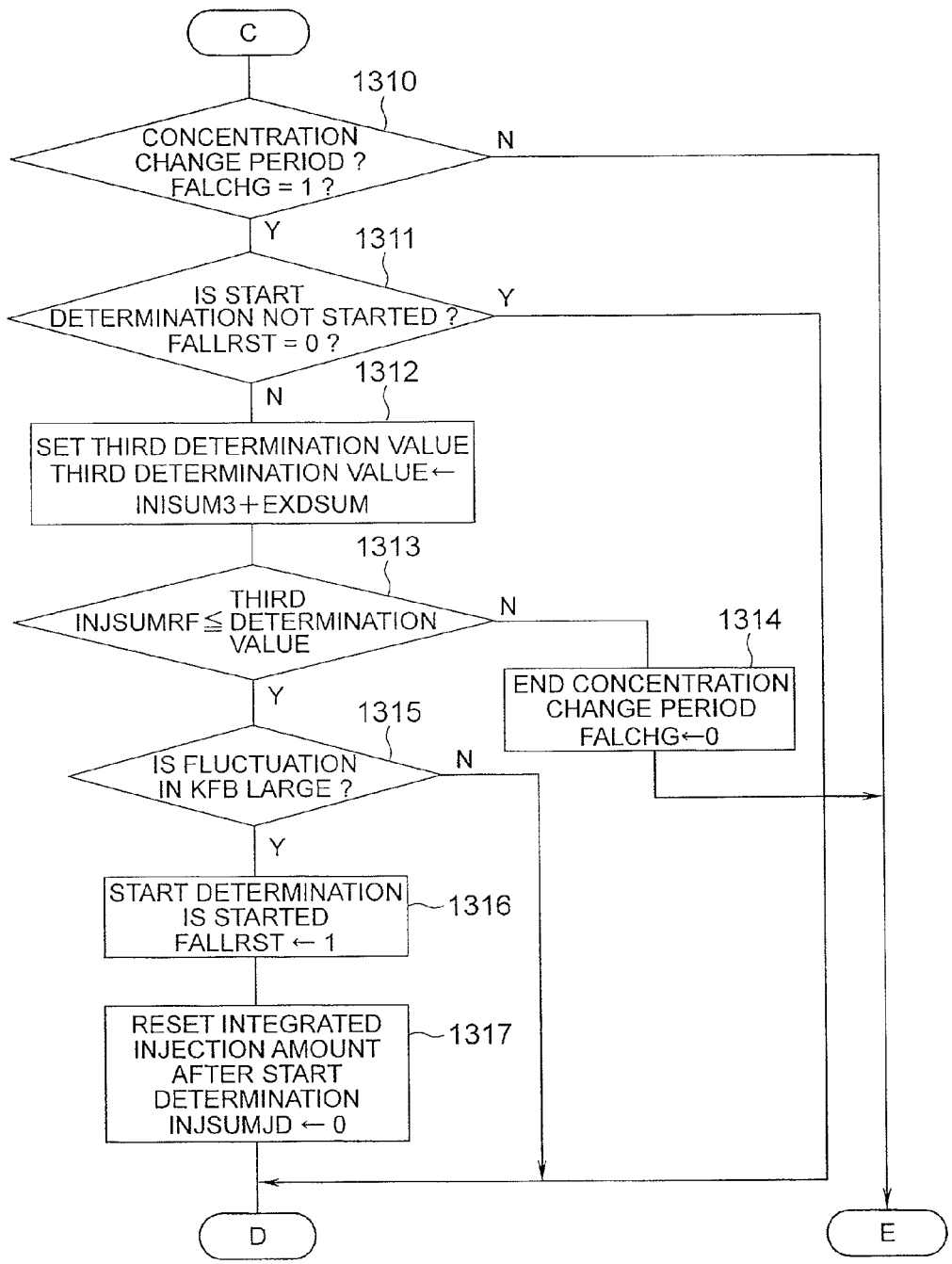
FIG. 12 is a flowchart following the flowchart of FIG. 11.
Figure 13:
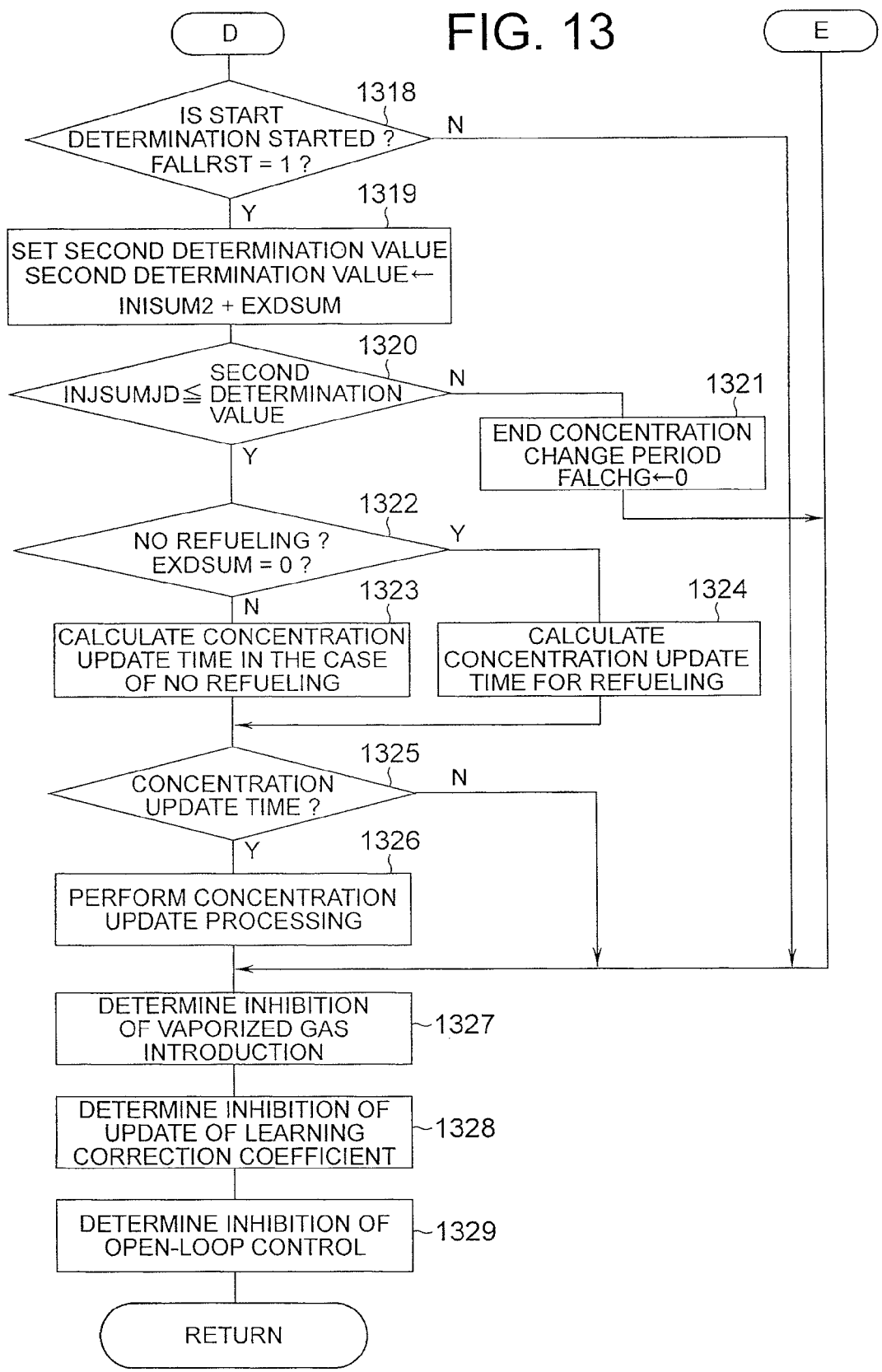
FIG. 13 is a flowchart following the flowchart of FIG. 12.

FIGS. 11 to 13 illustrate a calculation routine for alcohol concentration estimation according to the second embodiment replacing FIGS. 5 and 6 in the first embodiment. The calculation routine is executed at every predetermined time interval, for example, 5 ms.

In FIG. 11, first, in Step 1301, it is determined whether fuel is supplied to the fuel tank 20 in the same manner as Step 801 in the first embodiment.

When it is determined in Step 1302 that the fueling is not in a concentration change period, the control process proceeds to Step 1303 and processing of starting the concentration change period is performed. When it is determined that the fueling is in the concentration change period, the control process proceeds to Step 1307 and processing of extending the concentration change period is performed. The concentration change period is a period in which a change in alcohol concentration in dead time and a first order delay after fueling occurs. When it is determined that the fuel is supplied, if the fueling is not in the concentration change period, the concentration change period is started anew and, if the fueling is already in the concentration change period, end time of the concentration change period is extended.

When the concentration change period flag FALCHG is 0 in Step 1302, it is determined that the fueling is not in the concentration change period and the control process proceeds to Step 1303. In Step 1303, the concentration change period flag FALCHG is set to "1" and the concentration change period is started. In Step 1304, the extension value EXDSUM of the concentration change period is reset to "0". Subsequently, the integrated injection amount INJSUMRF after the start of the concentration change period is reset to "0". A start determination flag FALLRST is set to "0", which indicates that the start determination is not started, to make it possible to execute processing of start determination described later.

On the other hand, when it is determined that the fueling is in the concentration change period, in Step 1307, the extension value EXDSUM of the concentration change period is set to the integrated injection amount INJSUMRF after the start of the concentration change period.

$EXDSUM \leftarrow INJSUMRF$

As described above, the extension value EXDSUM is an integrated injection amount from the time point of the initial fueling to the time point of the refueling and is equivalent to the extension period of the end time of the concentration change due to the refueling.

When the fuel is injected and supplied from the injector 21 in Step 1308, the fuel injection amount Qfuel1 is added to the integrated injection amount INJSUMRF after the start of the concentration change period.

$INJSUMRF \leftarrow INJSUMRF + Q\text{fuel1}$

Subsequently, when the fuel is injected and supplied from the injector 21 in Step 1309, the fuel injection amount Qfuel1 is added to an integrated injection amount INJSUMJD after the start of the start determination.

$INJSUMJD \leftarrow INJSUMJD + Q\text{fuel1}$

The control process proceeds to FIG. 12. When it is determined in Step 1310 that the fueling is in the concentration change period (FALCHG=1), a series of start determination processing and concentration estimation processing are performed.

When it is determined in Step 1311 that the start determination is not started (FALLRST=0), processing of the start determination is performed.

In Step 1312, a third determination value used for determination of end time of the start determination is calculated based on an initial value INISUM3 and the extension value EXDSUM.

Third determination value $\leftarrow INISUM3 + EXDSUM$

Figure 14:
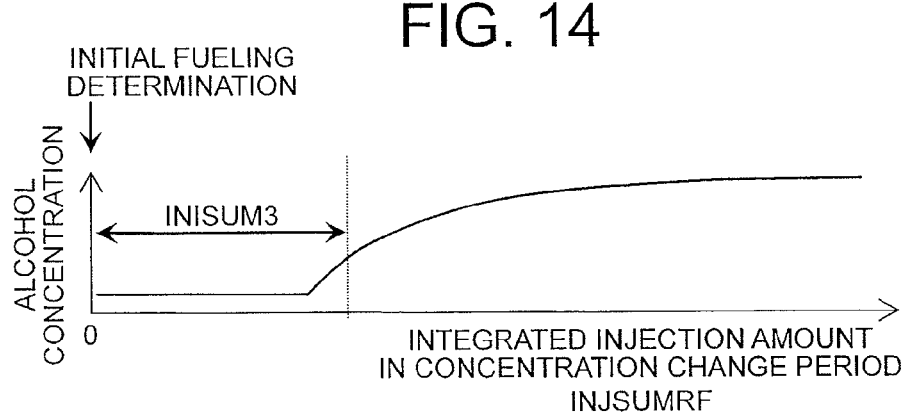
FIG. 14 is an explanatory diagram illustrating setting of a third determination value according to the second embodiment of the present invention.

The initial value INISUM3 is set to an integrated injection amount in a period from a time point of the initial fueling to a time point after the start of the first order delay as illustrated in FIG. 14. The initial value INISUM3 is set to be adjusted to a longest period of the dead time with fluctuation width of end time of the dead time taken into account.

Subsequently, when it is determined in Step 1313 that the integrated injection amount INJSUMJD after the start determination exceeds the third determination value, the concentration change period flag FALCHG is set to "0" and the concentration change period is ended.

When the refueling determination is not made and EXDSUM is "0", if start determination described later is not started even if the integrated injection amount INJSUMRF after the start of the concentration change period reaches INISUM3, the concentration change period is ended because it can be determined that an alcohol concentration change is not caused by the initial fueling.

Figure 15:
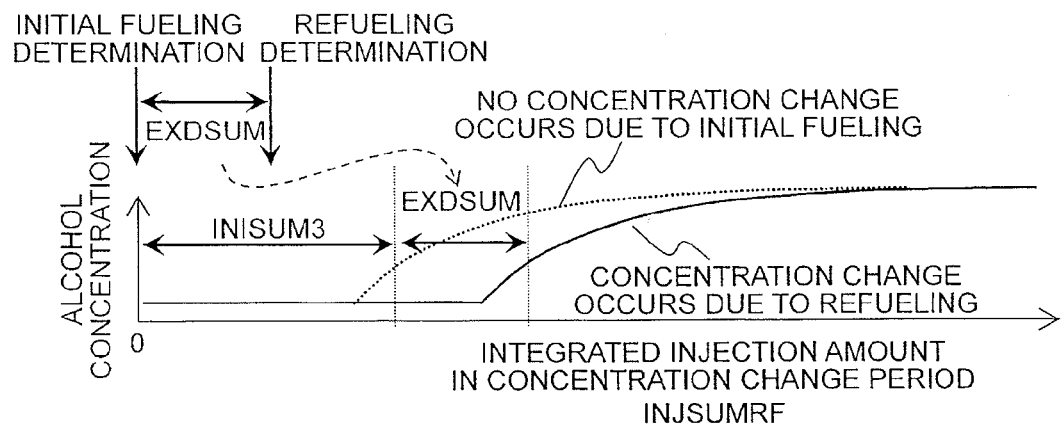
FIG. 15 is an explanatory diagram illustrating setting of the third determination value according to the second embodiment of the present invention.

When the refueling determination is made, there is a possibility that a concentration change is caused by the refueling even if a concentration change is not caused by the initial fueling as illustrated in FIG. 15. Therefore, it is possible to perform the start determination according to the concentration change due to the refueling by extending the end time of the start determination by EXDSUM.

Therefore, an implementation period of the start determination is extended by the refueling determination, it is possible to perform the start determination and improve the concentration estimation accuracy even when a concentration change is not caused by the initial fueling but a concentration change is caused by the refueling. It is possible to end the concentration change period when a concentration change is not caused by the initial fueling and the refueling. It is possible to prevent degradation in functions of the other controls involved in the concentration estimation.

When the end time of the start determination has not come, in Step 1315, the start determination is performed based on fluctuation in air-fuel ratio feedback correction coefficient. When a fluctuation amount from the center "1" of the air-fuel ratio feedback correction coefficient KFB exceeds a predetermined threshold, it is possible to determine that a period of the dead time after the fueling ends and a concentration change in the first order delay is started. Therefore, the start determination flag FALLRST is set to "1" to start the start determination. Subsequently, the integrated injection amount INJSUMJD after the start of the start determination is reset to "0".

A coefficient obtained by applying filter processing or moving average processing to the air-fuel ratio feedback correction coefficient KFB may be used for the start determination. A determination delay may be provided in time or an integrated injection amount from the time when the fluctuation amount exceeds the predetermined threshold until the start determination is started. The start determination may be carried out only in a period when it is highly possible that the dead time ends. The start determination may be started after the integrated injection amount INJSUMRF after the start of the concentration change period increases to be equal to or larger than a predetermined value as in the period Q3 illustrated in FIG. 21. Consequently, the accuracy of the start determination is improved.

Next, the control process proceeds to FIG. 13. When it is determined in Step 1318 that the start determination is started (FALLRST=1), the processing of concentration estimation is carried out.

In Step 1319, a second determination value used for determination of end time of the concentration change period is calculated based on the initial value INISUM and the extension value EXDSUM.

Second determination value←$INISUM2+EXDSUM$

The initial value INISUM2 is set to a value equivalent to an integrated injection amount in the period of the first order delay, such as Q2 of FIG. 21. EXDSUM is the extension value of the concentration change period due to the refueling, and hence the second determination value is set to an integrated injection amount in a period from a time point when the concentration change starts to a time point when the concentration change due to the refueling ends.

Subsequently, when it is determined in Step 1320 that the integrated injection amount INJSUMJD after the start of the start determination exceeds the second determination value, FALCHG is set to "0" and the concentration change period is ended.

In Step 1322, it is determined whether the refueling determination is made in the concentration change period. Similarly to Step 812 of the first embodiment, it can be determined, based on the extension value EXDSUM of the concentration change period, whether the refueling determination is made. When the extension value EXDSUM is "0", it is determined that the refueling determination is not made and the control process proceeds to Step 1323. Concentration update time in the case in which the refueling determination is not made is set. When EXDSUM is other than 0, it is determined that the refueling determination is made and the control process proceeds to Step 1324. Concentration update time in the case in which the refueling determination is made is set.

During the concentration update, it is necessary to perform inhibition of vaporized gas introduction and inhibition of air-fuel ratio feedback control stop, which are described later. Therefore, degradation in functions of the controls other than the concentration estimation occurs.

Therefore, it is possible to minimize the degradation in functions of other controls by discretely setting update time according to the behavior of a concentration change. Further, by changing the concentration update time according to presence or absence of refueling, it is possible to set the concentration update time suitable for the behavior of a concentration change due to presence or absence of refueling while minimizing the degradation in functions of the other controls. Therefore, a concentration estimation error can be minimized.

In Step 1323, concentration update time in the case in which the refueling determination is not made is set. The concentration update time is calculated based on the integrated injection amount INJSUMJD after the start of the start determination according to two-dimensional map data illustrated in FIG. 16.

Because a time point when the start determination is started is after the end of the period of the dead time, unlike FIG. 7 of the first embodiment, there is no period corresponding to the dead time. For a short while after the start of a concentration change in the first order delay, because concentration change speed is high, the concentration update is permitted to enable following the concentration change. Thereafter, a stop interval of the concentration update is set gradually longer. However, the concentration change speed in the first order delay gradually decreases, and hence it is possible to follow the concentration change.

In Step 1324, concentration update time in the case in which the refueling determination is made is set. The update time is calculated according to two-dimensional map data illustrated in FIG. 17 as in FIG. 18.

A concentration change in the case in which the refueling is performed is superimposition of a concentration change in the dead time and the first order delay due to the initial fueling and a concentration change in the dead time and the first order delay due to the refueling, and hence the behavior of the concentration change is not a simple first order delay and is a more complicated behavior.

Therefore, it is possible to follow the complicated concentration change by setting a stop interval of the concentration update short. A setting period of INJSUMJD is set longer to make it possible to deal with a case where the extended period is longer.

When the concentration update time is calculated in Step 1323 or 1324, the concentration update is performed in Step 1326. KAL is updated based on the present alcohol concentration correction coefficient KAL and the integral term KI of the air-fuel ratio feedback correction coefficient according to the same method as Step 816 in the first embodiment.

In Step 1327, it is determined whether an introduction inhibition condition for vaporized gas is satisfied.

When the concentration update time is calculated in Step 1323 or 1324 or when the start determination in Step 1315 is executed, introduction of the vaporized gas is inhibited. When the vaporized gas introduction is inhibited, the introduction inhibition flag FALPRG is set to "1" and, when the vaporized gas introduction is not inhibited, the introduction inhibition flag is set to "0". It is possible to prevent fluctuation in the air-fuel ratio feedback correction coefficient KFB due to the vaporized gas introduction. As a result, the alcohol concentration estimation accuracy and start determination accuracy are improved.

Figure 16:
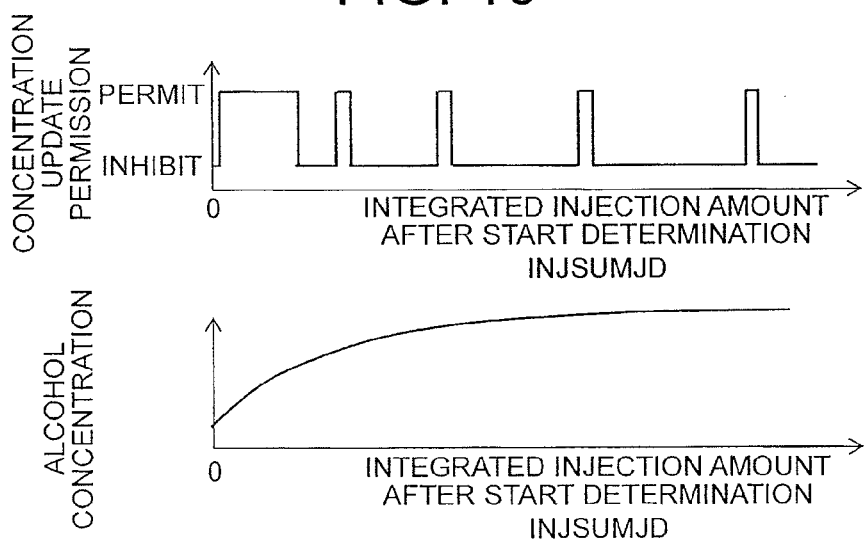
FIG. 16 is an explanatory diagram illustrating a two-dimensional map for update permission time setting for an alcohol concentration estimation value according to the second embodiment of the present invention.
Figure 17:
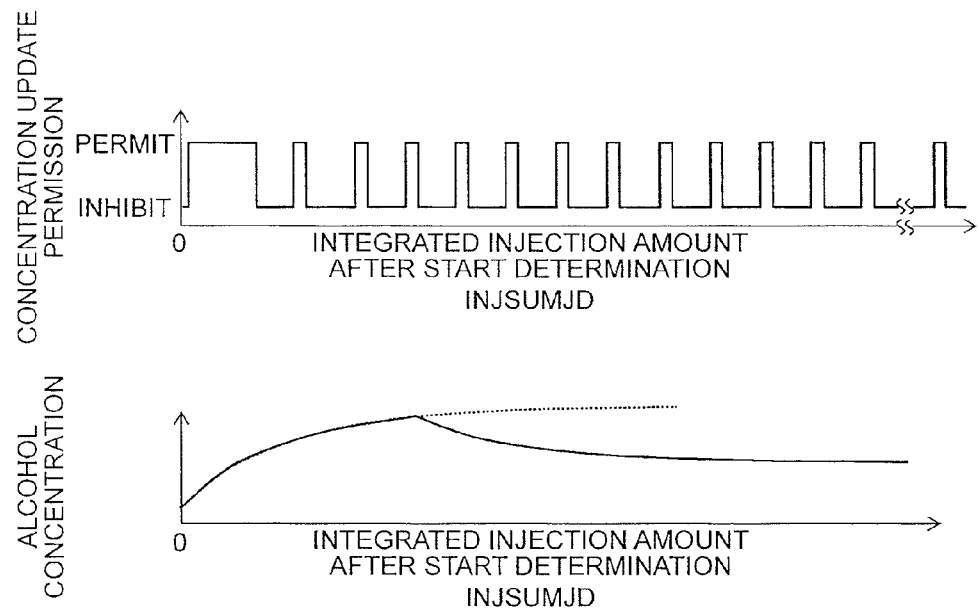
FIG. 17 is an explanatory diagram illustrating a two-dimensional map for the update permission time setting for the alcohol concentration estimation value according to the second embodiment of the present invention.

As in the first embodiment, the introduction of the vaporized gas is appropriately permitted according to presence or absence of refueling as illustrated in FIG. 16 or 17 even in the concentration change period. This enables minimizing a fall in introduction amount of the vaporized gas irrespectively of presence or absence of the refueling and, at the same time, prevent degradation in alcohol concentration estimation accuracy.

Further, because an appropriate implementation period of the start determination is set according to presence or absence of the refueling, it is possible to minimize degradation in introduction amount of the vaporized gas and, at the same time, improve the alcohol concentration estimation accuracy.

In Step 1328, it is determined whether a learning value update inhibition condition of the learning correction coefficient KLRN of the air-fuel ratio feedback correction coefficient is satisfied. When the fueling is in the concentration change period as in the first embodiment, update of a learning value is inhibited. When the update of the learning value is inhibited, the learning value update permission flag FFBLRN is set to 0 and, when the update of the learning value is not inhibited, the learning value update permission flag FFBLRN is set to 1. Therefore, it is possible to prevent mislearning of the learning value due to an alcohol concentration change and improve the estimation accuracy of alcohol concentration irrespectively of presence or absence of the refueling.

In Step 1329, it is determined whether a condition for inhibiting the air-fuel open-loop control is satisfied. Examples of the air-fuel open-loop control include fuel enriching control for increasing power under high load, fuel leaning control for improvements in fuel consumption, fuel enriching control at low cooling water temperature, and fuel leaning control after engine start.

When the concentration update time is calculated in Step 1323 or 1324 or when the start determination in Step 1315 is executed, the air-fuel ratio open-loop control is inhibited. It is possible to improve the alcohol concentration estimation accuracy and the start determination accuracy by inhibiting the air-fuel ratio open-loop control and surely performing the air-fuel ratio feedback control.

As in the first embodiment, the air-fuel ratio open-loop control is inhibited only in time when the concentration update is necessary according to the behavior of a concentration change due to presence or absence of the refueling as illustrated in FIG. 16 or 17 even in the concentration change period. This enables minimizing degradation in a function of the open-loop control irrespectively of presence or absence of the refueling and, at the same time, prevent degradation in alcohol concentration estimation accuracy.

Further, because an appropriate implementation period of the start determination is set according to presence or absence of the refueling, it is possible to minimize degradation in function of the open-loop control and, at the same time, improve the start determination accuracy and the alcohol concentration estimation accuracy.

As in the first embodiment, various control constants are stored in the backup RAM or the EEPROM in the ECU 35 and designed not to be reset even when the engine 10 is stopped or the power supply to the ECU 35 is turned off. When the backup RAM or the EEPROM is reset, an initial value of the alcohol concentration correction coefficient KAL is set to a correction coefficient corresponding to an intermediate alcohol concentration. However, it is necessary to re-estimate the alcohol concentration, and hence, in Step 1301, it is determined that the fuel is supplied and, in Step 1315, it is determined that the start determination is started, whereby alcohol concentration estimation is forcibly started.

Figure 18:
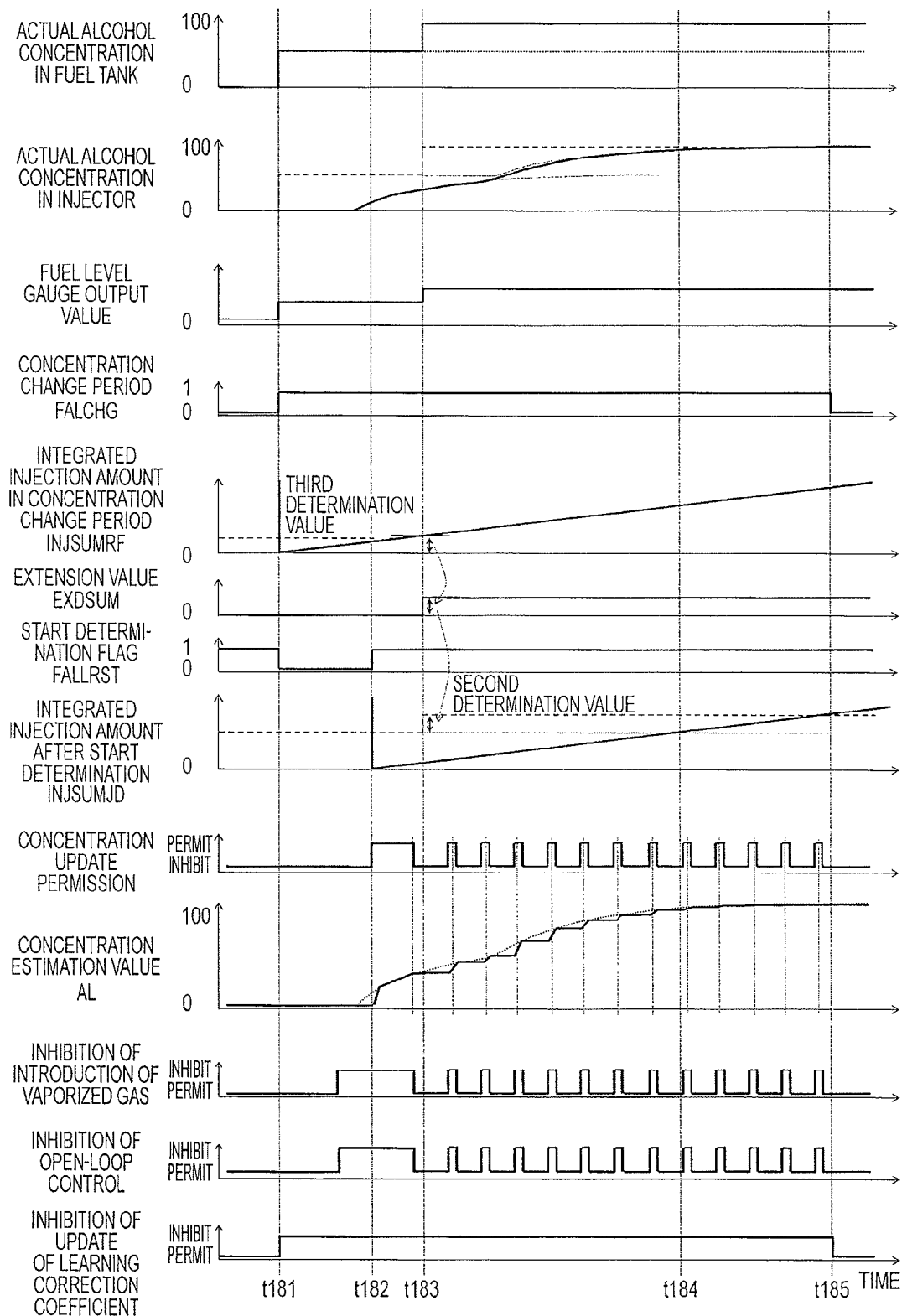
FIG. 18 is a timing chart illustrating alcohol concentration estimation processing according to the second embodiment of the present invention.
Figure 19:
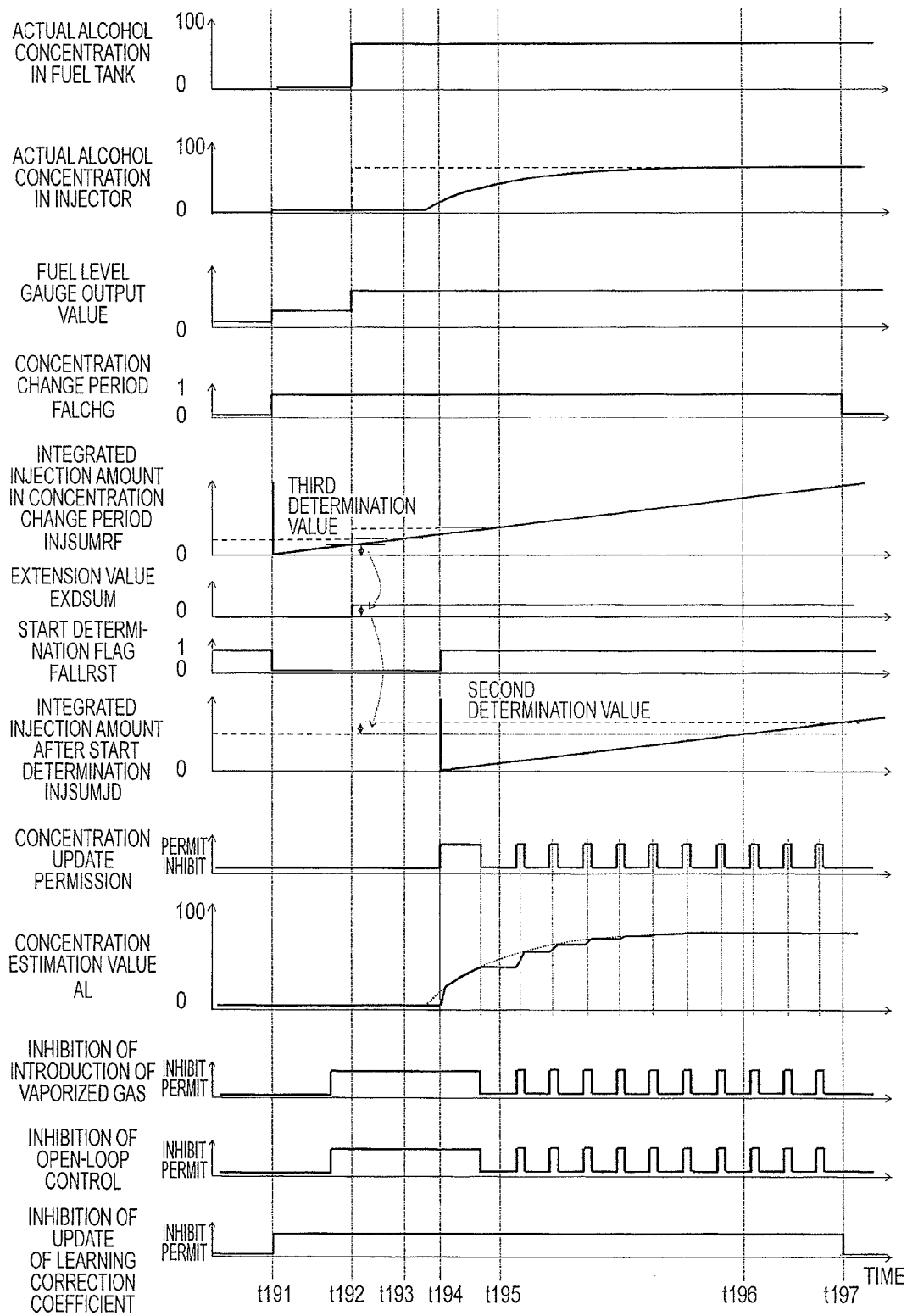
FIG. 19 is a timing chart illustrating the alcohol concentration estimation processing according to the second embodiment of the present invention.
Figure 20:
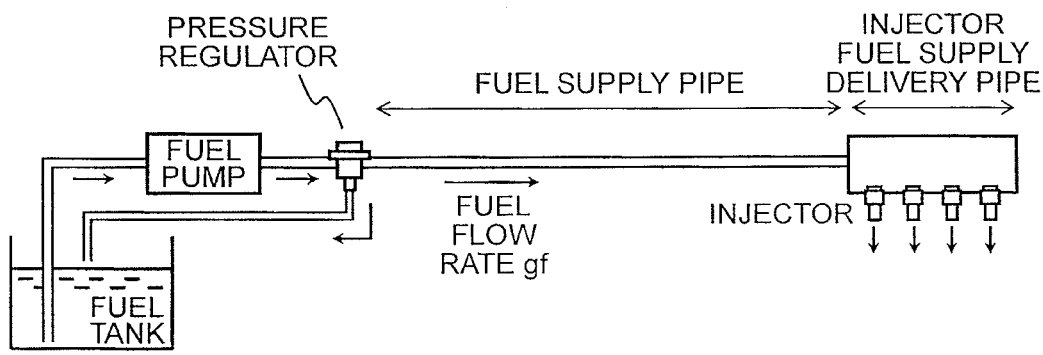
FIG. 20 is a block diagram schematically illustrating a configuration of a general returnless fuel supply system used in the control apparatus for an internal combustion engine.

Specific behaviors (temporal changes) of parameters according to the second embodiment of the present invention are described below with reference to timing charts illustrated in FIGS. 18 and 19. FIGS. 18 and 19 illustrate processing operation by the calculation routine illustrated in FIGS. 11 and 13, and illustrate temporal changes of the respective parameters in association with one another.

In FIG. 18, behaviors at the time when the alcohol concentration before fueling is 0% and the alcohol concentration in the fuel tank 20 changes to 50% because of the initial fueling and changes to 80% because of refueling are illustrated.

At time t181, high-concentration alcohol fuel is supplied and the actual alcohol concentration in the fuel tank 20 changes from 0% to 50%. At time t183, the high-concentration alcohol fuel is supplied again and the actual alcohol concentration in the fuel tank 20 changes from 50% to 80%.

The actual alcohol concentration in the injector 21 is, because of a fuel delivery delay in the returnless fuel supply system, superimposition of a concentration change in the dead time and the first order delay due to the initial fueling and a concentration change in the dead time and the first order delay due to the refueling. The alcohol concentration change due to the initial fueling ends at time t184. However, end time of the alcohol concentration change due to the refueling is extended to time t185.

At the time t181, it is determined that the fuel has been supplied based on a change in the fuel level gauge 9 and, because the fueling is not in the concentration change period, the concentration change period flag FALCHG is set to "1", and the concentration change period is started. Further, the integrated injection amount INJSUMRF after the start of the concentration change period is reset to "0", and fuel injection amounts are integrated. The end time of the start determination is determined based on INJSUMRF. The start determination flag FALLRST is set to "0" and the start determination is set as not having been started.

At time t182, the delay in the dead time after the initial fueling ends and a concentration change in the first order delay starts. Fluctuation in air-fuel ratio feedback correction coefficient caused by the concentration change exceeds a predetermined threshold. Therefore, FALLRST is set to "1" and the start determination is set as having been started. Further, the integrated injection amount INJSUMJD after the start of the start determination is reset to "0" and fuel injection amounts are integrated.

At the time t183, it is determined that the fuel has been supplied again based on a change in the fuel level gauge 9 and the fueling is in the concentration change period. Therefore, the extension value EXDSUM of a second determination value is set to INJSUMRF at the time t183. The second determination value is increased from an initial value INISUM2 by EXDSUM.

The concentration change period is ended when the integrated injection amount INJSUMJD after the start of the start determination exceeds the second determination value. Therefore, the end time of the concentration change period is extended from time t184 to time t185.

Therefore, the concentration change period can be extended to the end time of the concentration change due to the refueling. Therefore, it is possible to set the concentration change time corresponding to the concentration change due to the initial fueling and the refueling, and improve the alcohol concentration estimation accuracy.

The setting map for the concentration update permission time is switched, according to the refueling determination, from a setting map without the refueling determination illustrated in FIG. 16 to a setting map with the refueling determination illustrated in FIG. 17 at the time t183. Permission of concentration update is determined from the setting map based on INJSUMJD. The concentration estimation value AL is updated when the permission of the concentration update is determined. Because the concentration update permission time is switched according to the refueling determination, the concentration estimation value AL can follow more complicated behavior of the concentration change which occurs when the refueling is performed. A concentration estimation error can be minimized.

Further, the introduction of the vaporized gas and the open-loop control are inhibited during the start determination and when the permission of the concentration update is determined, and hence it is possible to realize improvement in accuracy of the start determination and improvement in concentration estimation accuracy.

Further, the concentration update permission time is discretely set according to the behavior of the concentration change, and hence it is possible to minimize degradation in functions of introduction control for the vaporized gas and open-loop control. The update inhibition period for the learning correction coefficient is extended from the time t183 to the time t184 according to the refueling determination. Therefore, it is possible to realize prevention of mislearning due to the concentration change due to the refueling and improve the concentration estimation accuracy.

Next, in FIG. 19, behaviors at the time when the alcohol concentration before fueling is 0% and the alcohol concentration in the fuel tank 20 does not change with the initial fueling but changes to 60% because of refueling are illustrated.

At time t191, low-concentration alcohol fuel is supplied and the actual alcohol concentration in the fuel tank 20 does not change from 0%. At time t192, the high-concentration alcohol fuel is supplied and the actual alcohol concentration in the fuel tank 20 changes from 0% to 60%.

The actual alcohol concentration in the injector 21 is, because of a fuel delivery delay in the returnless fuel supply system, superimposition of a concentration change in the dead time and the first order delay due to the initial fueling and a concentration change in the dead time and the first order delay due to the refueling. Because an alcohol concentration change is not caused by the initial fueling, a start time point of the alcohol concentration change is the end point of the dead time of the refueling.

At the time t191, it is determined that the fuel has been supplied based on a change in the fuel level gauge 9 and, because the fueling is not in the concentration change period, the concentration change period flag FALCHG is set to "1", and the concentration change period is started. Further, the integrated injection amount INJSUMRF after the start of the concentration change period is reset to "0", and fuel injection amounts are integrated. The end time of the start determination is determined based on INJSUMRF. The start determination flag FALLRST is set to "0" and the start determination is set as not having been started.

At the time t192, it is determined that the fuel has been supplied again based on a change in the fuel level gauge 9 and the fueling is in the concentration change period. Therefore, the extension value EXDSUM of a third determination value is set to INJSUMRF at the time t192. The third determination value is increased from an initial value INISUM3 by EXDSUM.

When the integrated injection amount INJSUMRF after the start of the concentration change period exceeds the third determination value, the start determination is ended and the concentration change period is ended. According to an increase in the third determination value, the end time of the start determination is extended from time t193 to time t195.

When the extension is not performed as in the conventional apparatus, the start determination is ended at the time t193 before a concentration change due to the refueling starts. Therefore, concentration estimation corresponding to the concentration change due to the refueling cannot be carried out and the estimation accuracy is deteriorated. On the other hand, as in this embodiment, by extending the end time to the time t195 according to the refueling determination, the start determination can be started based on the concentration change due to the refueling, and the concentration estimation can be carried out. Therefore, it is possible to improve the estimation accuracy.

Therefore, because the implementation period of the start determination is extended according to the refueling determination, it is possible to perform the start determination and improve the concentration estimation accuracy even when a concentration change is not caused by the initial fueling and a concentration change is caused by the refueling. The concentration change period can be ended when a concentration change is not caused by the initial fueling and the refueling. Therefore, it is possible to prevent a fall in functions of other controls such as introduction control for vaporized gas involved in the concentration estimation.

At time t194, the dead time after the refueling ends and a concentration change in the first order delay starts, and fluctuation in air-fuel ratio feedback correction coefficient caused by the concentration change exceeds a predetermined threshold. Therefore, FALLRST is set to "1" and the start determination is set as having been started. The integrated injection amount INJSUMJD after the start of the start determination is reset to "0" and fuel injection amounts are integrated.

Therefore, as in the case of FIG. 18, the concentration change period is set until the integrated injection amount INJSUMJD after the start of the start determination exceeds the second determination value. Therefore, it is possible to accurately perform update of a concentration estimation value corresponding to the concentration change due to the refueling.

A vaporized gas introduction inhibition period and an open-loop control inhibition period during implementation of the start determination are extended according to the refueling determination. Therefore, it is possible to realize improvement in accuracy of the start determination and improvement in concentration estimation accuracy.

In the first and second embodiments, in the concentration change period, it is likely that fluctuation in the air-fuel ratio feedback increases due to an alcohol concentration change. Therefore, diagnosis of a failure due to the fluctuation in the air-fuel ratio feedback correction coefficient may be inhibited to exclude a factor due to the alcohol concentration change from the failure diagnosis. The concentration change period is extended according to the refueling determination in the concentration change period. Therefore, it is possible to set a period of a concentration change due to the initial fueling and the refueling as a period for inhibiting the failure diagnosis, and therefore setting accuracy is improved.

Further, update of a final concentration estimation value in the concentration change period may be performed when a predetermined operation condition for an engine 1010 that can improve the estimation accuracy is satisfied. Examples of the operation condition includes the intake air amount qa being equal to or larger than a predetermined value and cooling water temperature being equal to or higher than a predetermined value.

As the intake air amount qa passing through the throttle valve 14 is lower, the influence of disturbance due to a channel to the intake pipe 12 other than the throttle valve 14 (e.g., air channel for crankcase emission gas, brake master back, or the like leaking from the engine 1010) becomes relatively larger. Therefore, it is likely that the fluctuation in the air-fuel ratio feedback correction coefficient KFB increases and the concentration estimation accuracy falls. Further, it is likely that the influence of various disturbances occurs and the concentration estimation accuracy falls until cooling water temperature is stabilized at high temperature.

In the first embodiment, it is also possible to start the update of the final concentration estimation value after the integrated injection amount INJSUMRF after the start of the concentration change period exceeds the first determination value and end the concentration change period when the update ends.

Further, in the second embodiment, it is also possible to start the update of the final concentration estimation value after the integrated injection amount INJSUMJD after the start of the start determination exceeds the second determination value and end the concentration change period when the update ends. The concentration change period is extended according to the refueling determination in the concentration change period. Therefore, it is possible to perform the update of the final concentration estimation value after the concentration change due to the initial fueling and the refueling ends, which results in improved concentration estimation.

Conversion Examples

As the oxygen concentration sensor oxygen 29, a linear-type concentration sensor having a linear output with respect to the air-fuel ratio change of the exhaust gas may be used to carry out air-fuel ratio feedback control. Because the alcohol concentration can be estimated, similar effects can be obtained.

Moreover, as the oxygen concentration sensor 29, in the case of using a linear-type oxygen concentration sensor, in air-fuel ratio enriching or leaning control other than theoretical air-fuel ratio control, too, the estimation of the alcohol concentration may be made by executing air-fuel ratio feedback control while setting the target air-fuel ratio to a rich or lean value. At this time, even during the alcohol concentration change, air-fuel ratio feedback control for enriching or leaning the air-fuel ratio is performed, and enriching and leaning control is not inhibited.

Although the description has been made by using proportional and integral calculations for the air-fuel ratio feedback control, any method of performing air-fuel ratio feedback control based on the detected air-fuel ratio of the oxygen concentration sensor 29 can estimate the alcohol concentration by using the air-fuel ratio feedback correction coefficient KFB, and hence similar effects can be obtained.

The oxygen concentration sensor 29 needs only to be a sensor that can detect the air-fuel ratio of the exhaust gas, and hence, even with the use of a linear-type air-fuel ratio sensor, a NOx sensor, an HC sensor, a CO sensor, and the like, the air-fuel ratio feedback control may be carried out, and the alcohol concentration estimation may be made. Thus, similar effects can be achieved.

What is claimed is:

1. A control apparatus for an internal combustion engine, comprising:

a fuel supply device for supplying fuel in a fuel tank to the internal combustion engine;

air-fuel ratio detecting means that is set in an exhaust system of the internal combustion engine, for detecting an air-fuel ratio in exhaust gas from the internal combustion engine;

air-fuel ratio correction amount calculating means for calculating, based on a detection value of the air-fuel ratio detecting means, an air-fuel ratio correction amount for correcting a fuel injection amount to the internal combustion engine;

concentration estimating means for calculating a concentration estimation value of a single composition of the fuel based on the air-fuel ratio correction amount calculated by the air-fuel ratio correction amount calculating means; and fuel injection amount calculating means for correcting the fuel injection amount based on the air-fuel ratio correction amount and the concentration estimation value, wherein the concentration estimating means comprises:

fueling determining means for detecting that the fuel has been supplied to the fuel tank;

concentration change period setting means for starting a concentration change period when it is determined by the fueling determining means that fueling has been performed and the fueling is in a period other than the concentration change period, and ending the concentration change period when an integrated fuel injection amount after start of the concentration change period reaches a first determination value;

concentration change period extending means for increasing, when it is determined by the fueling determining means that the fueling has been performed and the fueling is in the concentration change period, the first determination value by an integrated fuel injection amount from a start time point of the concentration change period until a time point when it is determined that the fueling has been performed; and concentration update permitting means for permitting concentration update in the concentration change period; and the concentration estimating means extends a concentration estimation period when it is determined that refueling has been performed during concentration change.

2. The control apparatus for an internal combustion engine according to claim 1, wherein the concentration update permitting means sets an update permission time for permitting the concentration update based on an integrated fuel injection amount after the start of the concentration change period, and changes a set value of the update permission time when it is determined by the fueling determining means that the fueling has been performed and the fueling is in the concentration change period.

3. The control apparatus for an internal combustion engine according to claim 1, further comprising:
   a canister for adsorbing vaporized gas generated from the fuel in the fuel tank; and
   vaporized gas introducing means for introducing the vaporized gas adsorbed by the canister into the internal combustion engine,
   wherein the concentration estimating means further comprises vaporized gas introduction inhibiting means for inhibiting the introduction of the vaporized gas when concentration estimation is permitted by the concentration update permitting means.

4. The control apparatus for an internal combustion engine according to claim 1, wherein the concentration estimating means further comprises:
   learning correcting means for correcting the fuel injection amount by using a learning correction coefficient to be updated by using the air-fuel ratio correction amount; and
   learning value update inhibiting means for inhibiting update of the learning correction coefficient in the concentration change period.

5. The control apparatus for an internal combustion engine according to claim 1, wherein the concentration estimating means further comprises air-fuel ratio correction stop inhibiting means for inhibiting stop of calculation of the air-fuel ratio correction amount by the air-fuel ratio correction amount calculating means when concentration estimation is permitted by the concentration update permitting means.

6. A control apparatus for an internal combustion engine, comprising:
   a fuel supply device for supplying fuel in a fuel tank to the internal combustion engine;
   air-fuel ratio detecting means that is set in an exhaust system of the internal combustion engine, for detecting an air-fuel ratio in exhaust gas from the internal combustion engine;
   air-fuel ratio correction amount calculating means for calculating, based on a detection value of the air-fuel ratio detecting means, an air-fuel ratio correction amount for correcting a fuel injection amount to the internal combustion engine;
   concentration estimating means for calculating a concentration estimation value of a single composition of the fuel based on the air-fuel ratio correction amount calculated by the air-fuel ratio correction amount calculating means; and
   fuel injection amount calculating means for correcting the fuel injection amount based on the air-fuel ratio correction amount and the concentration estimation value,
   wherein the concentration estimating means comprises:
      fueling determining means for detecting that the fuel has been supplied to the fuel tank;
      start determining means for determining that a start condition is satisfied when the fueling is in the concentration change period and fluctuation in the air-fuel ratio correction amount increases;
      concentration change period setting means for starting a concentration change period when it is determined by the fueling determining means that fueling has been performed and the fueling is in a period other than the concentration change period, and ending the concentration change period when an integrated fuel injection amount after start of start determination reaches a second determination value;
      concentration change period extending means for increasing, when it is determined by the fueling determining means that the fueling has been performed and the fueling is in the concentration change period, the second determination value by an integrated fuel injection amount from a start time point of the concentration change period until a time point when it is determined that the fueling has been performed; and
      concentration update permitting means for permitting concentration update in a period from a time point of the start of the start determination until an end time point of the concentration change period; and
   the concentration estimating means extends a concentration estimation period after the start determination when it is determined that refueling has been performed during concentration change.

7. The control apparatus for an internal combustion engine according to claim 6, wherein the concentration change period setting means comprises:
   concentration change period suspending means for ending the concentration change period when the fueling is in the concentration change period, the start determination is not started, and the integrated fuel injection amount after start of the concentration change period reaches a third determination value; and
   start determination period extending means for increasing, when it is determined by the fueling determining means that the fueling has been performed and the fueling is in the concentration change period, the third determination value by the integrated fuel injection amount from the start time point of the concentration change period until the time point when it is determined that the fueling has been performed.

8. The control apparatus for an internal combustion engine according to claim 6, wherein the concentration update permitting means sets an update permission time for permitting concentration estimation based on an integrated fuel injection amount after the start of the start determination and changes a set value of the update permission time when it is determined by the fueling determining means that the fueling has been performed and the fueling is in the concentration change period.

9. The control apparatus for an internal combustion engine according to claim 6, wherein the concentration estimating means further comprises an evaporated gas introduction inhibiting means for inhibiting introduction of vaporized gas when the concentration estimation is permitted by the concentration update permitting means and when start determination is being performed by the start determining means.

10. The control apparatus for an internal combustion engine according to claim 6, wherein the concentration estimating means further comprises:
   learning correcting means for correcting the fuel injection amount by using a learning correction coefficient to be updated by using the air-fuel ratio correction amount; and
   learning value update inhibiting means for inhibiting update of the learning correction coefficient in the concentration change period.

11. The control apparatus for an internal combustion engine according to claim 6, wherein the concentration estimating means further comprises an air-fuel ratio correction stop inhibiting means for inhibiting stop of calculation of the air-fuel ratio correction amount by the air-fuel ratio correction amount calculating means when the concentration estimation is permitted by the concentration update permitting means and when start determination is being performed by the start determining means.

* * * * *